(12) United States Patent
Bai et al.

(10) Patent No.: US 11,388,690 B1
(45) Date of Patent: Jul. 12, 2022

(54) DYNAMIC TIMING ADVANCE ADJUSTMENT SCHEMES

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/140,877

(22) Filed: Jan. 4, 2021

(51) Int. Cl.
*H04W 56/00* (2009.01)
*H04W 80/02* (2009.01)
*H04W 8/08* (2009.01)
*H04W 8/24* (2009.01)

(52) U.S. Cl.
CPC ......... *H04W 56/0045* (2013.01); *H04W 8/08* (2013.01); *H04W 8/24* (2013.01); *H04W 56/001* (2013.01); *H04W 80/02* (2013.01)

(58) Field of Classification Search
CPC ..... H04W 56/0045; H04W 8/08; H04W 8/24; H04W 56/001; H04W 80/02
USPC ................ 370/329, 328, 338, 341, 345, 350
See application file for complete search history.

(56) References Cited

U.S. PATENT DOCUMENTS

| | | | | |
|---|---|---|---|---|
| 6,684,263 | B2* | 1/2004 | Horowitz | G06F 3/0658 710/104 |
| 2006/0083267 | A1* | 4/2006 | Laroia | H04L 7/08 370/503 |
| 2009/0245076 | A1* | 10/2009 | Kurihara | G11B 7/006 |
| 2012/0153975 | A1* | 6/2012 | Arai | G01R 31/31924 324/750.01 |
| 2015/0085839 | A1 | 3/2015 | Bergstrom et al. | |
| 2019/0053182 | A1 | 2/2019 | Choi et al. | |
| 2019/0159156 | A1 | 5/2019 | Abedini et al. | |
| 2020/0178195 | A1* | 6/2020 | Dinan | H04W 72/0406 |

FOREIGN PATENT DOCUMENTS

| | | |
|---|---|---|
| WO | WO-2013112952 A1 | 8/2013 |
| WO | WO-2020034574 A1 | 2/2020 |

OTHER PUBLICATIONS

International Search Report and Written Opinion—PCT/US2021/060935—ISA/EPO—dated Mar. 4, 2022.

* cited by examiner

*Primary Examiner* — Nghi H Ly
(74) *Attorney, Agent, or Firm* — Holland & Hart LLP

(57) ABSTRACT

Methods, systems, and devices for wireless communications are described. A user equipment (UE) may transmit a capability or mobility mode indication to a base station. The base station may select a timing advance (TA) adjustment scheme based on the information included in the indication. The base station may select a TA adjustment scheme in which the UE autonomously adjusts a TA value; the UE adjusts the TA value after receiving a command from the base station; or the UE transmits a message to the base station including a proposed TA adjustment, and the UE adjusts the TA value after receiving an approval message from the base station. The base station may transmit a TA adjustment scheme configuration to the UE including an indication of the selected TA adjustment scheme. The UE may adjust a TA value for an uplink transmission based on applying the TA adjustment scheme.

30 Claims, 17 Drawing Sheets

Capability or Mobility Mode Indication 215

Uplink Transmission 230

TA Adjustment Scheme Configuration 220

DYNAMIC TIMING ADVANCE ADJUSTMENT SCHEMES

FIELD OF TECHNOLOGY

The following relates to wireless communications, including dynamic timing advance (TA) adjustment schemes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support dynamic timing advance adjustment schemes. Generally, the described techniques provide for a base station to dynamically configure a user equipment (UE) to use various timing advance (TA) adjustment schemes based on a capability or mobility mode at the UE. For example, the UE may transmit a capability or mobility mode indication to the base station, and the base station may select a TA adjustment scheme based on the information included in the indication. In some examples, the base station may select a TA adjustment scheme in which the UE autonomously adjusts a TA value. In some cases, the base station may select a TA adjustment scheme in which the UE adjusts the TA value after receiving a command from the base station. In some examples, the base station may select a TA adjustment scheme in which the UE may transmit a message to the base station including a proposed TA adjustment (e.g., a TA adjustment value), and the UE may adjust the TA value after receiving a message from the base station that approves the proposed TA adjustment. The base station may transmit a TA adjustment scheme configuration to the UE, which may include an indication of the selected TA adjustment scheme. In some examples, the UE may adjust a TA value for an uplink transmission based on applying the TA adjustment scheme.

A method for wireless communications at a UE is described. The method may include transmitting a first message including information associated with a TA adjustment procedure at the UE, where the information includes at least one of a UE capability or mobility mode of the UE, receiving a second message configuring the UE with a TA adjustment scheme that is from a set of multiple TA adjustment schemes, the TA adjustment scheme being based on the first message, and transmitting an uplink message based on performing the TA adjustment procedure, where the TA adjustment procedure includes applying a TA adjustment value to the uplink message in accordance with the TA adjustment scheme.

An apparatus for wireless communications at a UE is described. The apparatus may include a processor, memory in electronic communication with the processor, and instructions stored in the memory. The instructions may be executable by the processor to cause the apparatus to transmit a first message including information associated with a TA adjustment procedure at the UE, where the information includes at least one of a UE capability or mobility mode of the UE, receive a second message configuring the UE with a TA adjustment scheme that is from a set of multiple TA adjustment schemes, the TA adjustment scheme being based on the first message, and transmit an uplink message based on performing the TA adjustment procedure, where the TA adjustment procedure includes applying a TA adjustment value to the uplink message in accordance with the TA adjustment scheme.

Another apparatus for wireless communications at a UE is described. The apparatus may include means for transmitting a first message including information associated with a TA adjustment procedure at the UE, where the information includes at least one of a UE capability or mobility mode of the UE, means for receiving a second message configuring the UE with a TA adjustment scheme that is from a set of multiple TA adjustment schemes, the TA adjustment scheme being based on the first message, and means for transmitting an uplink message based on performing the TA adjustment procedure, where the TA adjustment procedure includes applying a TA adjustment value to the uplink message in accordance with the TA adjustment scheme.

A non-transitory computer-readable medium storing code for wireless communications at a UE is described. The code may include instructions executable by a processor to transmit a first message including information associated with a TA adjustment procedure at the UE, where the information includes at least one of a UE capability or mobility mode of the UE, receive a second message configuring the UE with a TA adjustment scheme that is from a set of multiple TA adjustment schemes, the TA adjustment scheme being based on the first message, and transmit an uplink message based on performing the TA adjustment procedure, where the TA adjustment procedure includes applying a TA adjustment value to the uplink message in accordance with the TA adjustment scheme.

In some examples of the method, apparatuses, and non-transitory computer-readable medium described herein, the TA adjustment scheme may include operations, features, means, or instructions for determining the TA adjustment value based on the information associated with the TA adjustment procedure and performing the TA adjustment procedure using the determined TA adjustment value.

In some examples of the method, apparatuses, and non-transitory computer-readable medium described herein, the TA adjustment scheme may include operations, features, means, or instructions for transmitting, to a base station, an indication of the determined TA adjustment value.

In some examples of the method, apparatuses, and non-transitory computer-readable medium described herein, the indication may be transmitted based on performing the TA adjustment procedure.

Some examples of the method, apparatuses, and non-transitory computer-readable medium described herein may further include operations, features, means, or instructions for receiving, from the base station, a third message configuring the indicated TA adjustment value, where the TA adjustment procedure may be performed based on receiving the third message configuring the indicated TA adjustment value.

Some examples of the method, apparatuses, and non-transitory computer-readable medium described herein may further include operations, features, means, or instructions for determining a second TA adjustment value based on the information associated with the TA adjustment procedure and refraining from applying the second TA adjustment value or transmitting an indication of the second TA adjustment value for a duration based on receiving the third message configuring the indicated TA adjustment value.

Some examples of the method, apparatuses, and non-transitory computer-readable medium described herein may further include operations, features, means, or instructions for receiving, from the base station, a configuration of a second TA adjustment value, where the indication of the second TA adjustment value may be received after transmitting the indication of the TA adjustment value and performing a second TA adjustment procedure using the second TA adjustment value based on the configuration of the second TA adjustment value.

Some examples of the method, apparatuses, and non-transitory computer-readable medium described herein may further include operations, features, means, or instructions for determining that the configuration of the second TA adjustment value may be received within a threshold time period after transmitting the indication of the TA adjustment value, where performing the second TA adjustment procedure may be based on the determination that the configuration of the second TA adjustment value may be received within the threshold time period.

In some examples of the method, apparatuses, and non-transitory computer-readable medium described herein, transmitting the indication of the determined TA adjustment value may include operations, features, means, or instructions for transmitting the indication of the determined TA adjustment value using uplink control information over an uplink shared channel, uplink control information over an uplink control channel, a medium access control (MAC)-control element (CE), or any combination thereof.

Some examples of the method, apparatuses, and non-transitory computer-readable medium described herein may further include operations, features, means, or instructions for monitoring, for a duration after transmitting the indication of the determined TA adjustment value, for a feedback message from the base station and receiving, from the base station and during the duration, the feedback message including feedback information, where the TA adjustment procedure may be performed based on receiving the feedback message.

In some examples of the method, apparatuses, and non-transitory computer-readable medium described herein, the feedback message indicates a second TA adjustment value and the method, apparatuses, and non-transitory computer-readable medium may include further operations, features, means, or instructions for performing a second TA adjustment procedure using the second TA adjustment value.

Some examples of the method, apparatuses, and non-transitory computer-readable medium described herein may further include operations, features, means, or instructions for monitoring, for a duration after transmitting the indication of the determined TA adjustment value, for a feedback message from the base station and transmitting, to the base station, an additional indication of the determined TA adjustment value based on failing to receive the feedback message during the duration.

In some examples of the method, apparatuses, and non-transitory computer-readable medium described herein, the determined TA adjustment value may be indicated per beam, per antenna panel, per transmission reception point, per beam group, per TA group, or any combination thereof and the TA adjustment scheme may be configured for one or more transmit beams corresponding to the beam, the antenna panel, the transmission reception point, the beam group, the TA group, or any combination thereof.

In some examples of the method, apparatuses, and non-transitory computer-readable medium described herein, determining the TA adjustment value may include operations, features, means, or instructions for measuring one or more parameters associated with a set of multiple synchronization signal blocks, where the one or more parameters include a reference signal received power (RSRP), a location of the UE, or both and calculating the TA adjustment value based on the one or more parameters.

Some examples of the method, apparatuses, and non-transitory computer-readable medium described herein may further include operations, features, means, or instructions for receiving, from a base station, a downlink control channel order for performing a random access procedure and refraining from performing the TA adjustment procedure using the determined TA adjustment value based on the downlink control channel order being received within a threshold time period of determining the TA adjustment value.

In some examples of the method, apparatuses, and non-transitory computer-readable medium described herein, the TA adjustment scheme may include operations, features, means, or instructions for receiving, from a base station, an indication of the TA adjustment value for the TA adjustment procedure based on the information associated with the TA adjustment procedure and performing the TA adjustment procedure using the indicated TA adjustment value.

In some examples of the method, apparatuses, and non-transitory computer-readable medium described herein, the first message includes a capability for the UE to support one or more TA adjustment schemes of the set of multiple TA adjustment schemes, one or more environmental conditions associated with the UE, or both.

A method for wireless communications at a base station is described. The method may include receiving, from a UE, a first message including information associated with a TA adjustment procedure at the UE, where the information includes at least one of a UE capability or mobility mode of the UE, selecting a TA adjustment scheme from a set of multiple TA adjustment schemes, where the TA adjustment scheme is selected based on the first message, transmitting a second message configuring the UE with the selected TA adjustment scheme, and receiving an uplink message from the UE in accordance with the selected TA adjustment scheme.

An apparatus for wireless communications at a base station is described. The apparatus may include a processor, memory in electronic communication with the processor, and instructions stored in the memory. The instructions may be executable by the processor to cause the apparatus to receive, from a UE, a first message including information associated with a TA adjustment procedure at the UE, where the information includes at least one of a UE capability or mobility mode of the UE, select a TA adjustment scheme from a set of multiple TA adjustment schemes, where the TA adjustment scheme is selected based on the first message, transmit a second message configuring the UE with the selected TA adjustment scheme, and receive an uplink message from the UE in accordance with the selected TA adjustment scheme.

Another apparatus for wireless communications at a base station is described. The apparatus may include means for receiving, from a UE, a first message including information associated with a TA adjustment procedure at the UE, where the information includes at least one of a UE capability or mobility mode of the UE, means for selecting a TA adjustment scheme from a set of multiple TA adjustment schemes, where the TA adjustment scheme is selected based on the first message, means for transmitting a second message configuring the UE with the selected TA adjustment scheme, and means for receiving an uplink message from the UE in accordance with the selected TA adjustment scheme.

A non-transitory computer-readable medium storing code for wireless communications at a base station is described. The code may include instructions executable by a processor to receive, from a UE, a first message including information associated with a TA adjustment procedure at the UE, where the information includes at least one of a UE capability or mobility mode of the UE, select a TA adjustment scheme from a set of multiple TA adjustment schemes, where the TA adjustment scheme is selected based on the first message, transmit a second message configuring the UE with the selected TA adjustment scheme, and receive an uplink message from the UE in accordance with the selected TA adjustment scheme.

In some examples of the method, apparatuses, and non-transitory computer-readable medium described herein, the TA adjustment scheme may include operations, features, means, or instructions for receiving, from the UE, an indication of a TA adjustment value determined at the UE.

In some examples of the method, apparatuses, and non-transitory computer-readable medium described herein, the indication may be received based on the UE performing the TA adjustment procedure.

Some examples of the method, apparatuses, and non-transitory computer-readable medium described herein may further include operations, features, means, or instructions for transmitting, to the UE, a third message configuring the indicated TA adjustment value.

Some examples of the method, apparatuses, and non-transitory computer-readable medium described herein may further include operations, features, means, or instructions for transmitting, to the UE, a configuration of a second TA adjustment value, where the indication of the second TA adjustment value may be transmitted before receiving the indication of the TA adjustment value.

Some examples of the method, apparatuses, and non-transitory computer-readable medium described herein may further include operations, features, means, or instructions for transmitting, to the UE and during a duration after receiving the indication of the determined TA adjustment value, a feedback message including feedback information.

In some examples of the method, apparatuses, and non-transitory computer-readable medium described herein, the feedback message indicates a second TA adjustment value.

Some examples of the method, apparatuses, and non-transitory computer-readable medium described herein may further include operations, features, means, or instructions for receiving, from the UE, an additional indication of the determined TA adjustment value.

In some examples of the method, apparatuses, and non-transitory computer-readable medium described herein, the determined TA adjustment value may be indicated per beam, per antenna panel, per transmission reception point, per beam group, per TA group, or any combination thereof and the TA adjustment scheme may be configured for one or more transmit beams corresponding to the beam, the antenna panel, the transmission reception point, the beam group, the TA group, or any combination thereof.

Some examples of the method, apparatuses, and non-transitory computer-readable medium described herein may further include operations, features, means, or instructions for transmitting, to the UE, a downlink control channel order for performing a random access procedure.

In some examples of the method, apparatuses, and non-transitory computer-readable medium described herein, the TA adjustment scheme may include operations, features, means, or instructions for transmitting, to the UE, an indication of a TA adjustment value for the TA adjustment procedure based on the information associated with the TA adjustment procedure.

DETAILED DESCRIPTION

Figure 1:
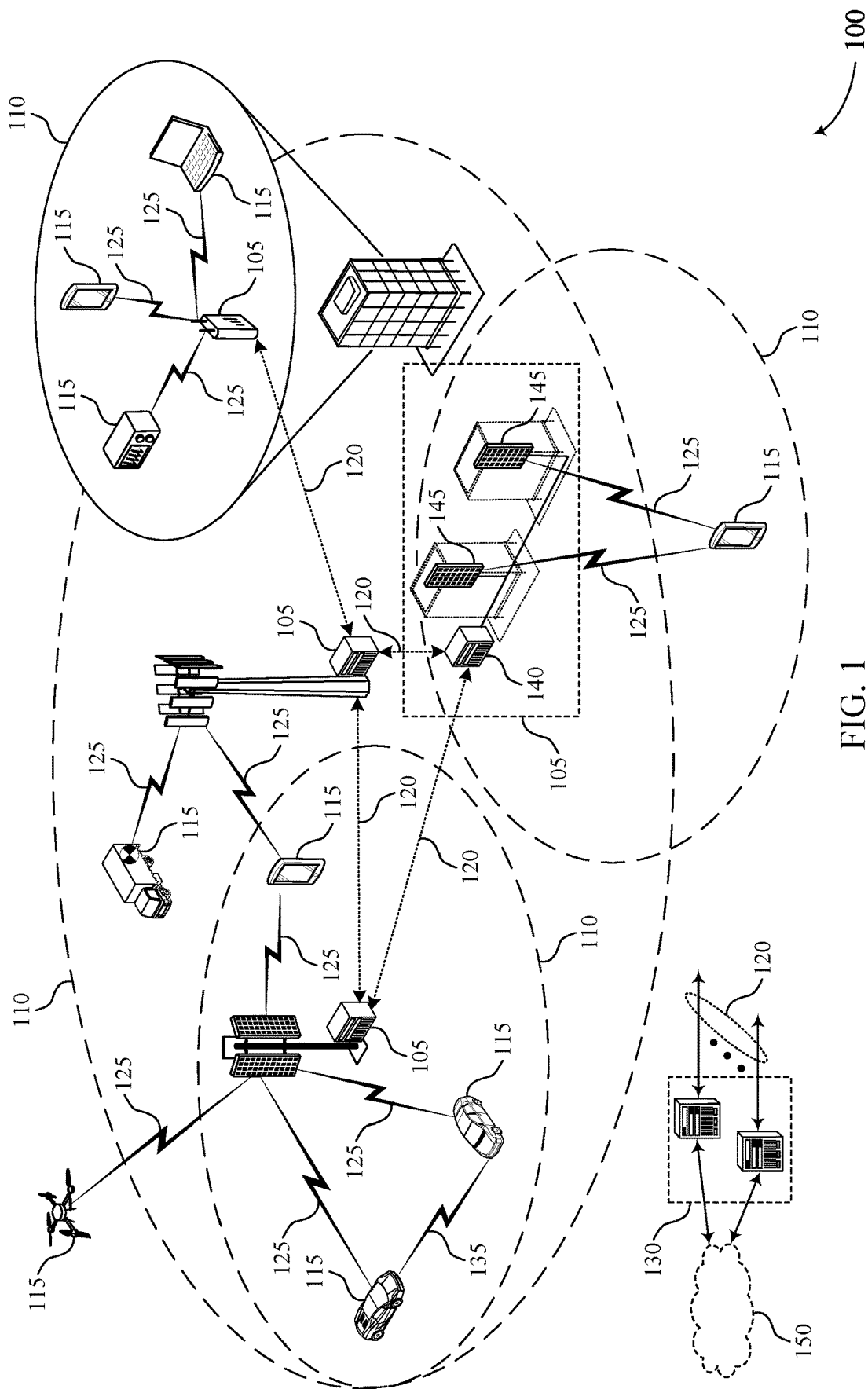
FIGS. 1 and 2 illustrate examples of wireless communications systems that support dynamic timing advance (TA) adjustment schemes in accordance with aspects of the present disclosure.

In some wireless communications systems, a base station may transmit an indication of a timing advance (TA) to a user equipment (UE), which the UE may use to adjust the timing of subsequent uplink transmissions. For example, a TA adjustment procedure may include a UE transmitting a message to a base station and the base station, in turn, calculating a timing correction based on when the base station received the message. The base station may then transmit an indication of the calculated timing correction (e.g., the TA adjustment value) to the UE. The UE may apply the TA adjustment for subsequent transmissions, where the UE may wait for an amount of time indicated by the TA (e.g., a round-trip time (RTT)) before transmitting an uplink message. In some cases, the UE may adjust the TA based on one or more changing conditions.

The UE may perform reception timing adjustment, which may be different than a TA adjustment, to correct for errors in a UE timing clock, to account for any base station changes to a downlink transmission timing, UE location changes, changes in the environment surrounding the UE, or the like. In the case of change of location or environment, the UE may adjust the TA based on the receive timing adjustment (e.g., when the receive timing difference is greater than a threshold value). For example, the UE may adjust the TA based on a base station command, may autonomously adjust the TA, or may adjust the TA according to some other TA adjustment scheme. Some wireless communication scenarios may benefit from one approach over another; however, a implementing a single approach across the different scenarios may result in inefficiencies in power adjustment and other issues. Put another way, a static or semi-static approach to power adjustment configurations may result in the UE utilizing a power adjustment scheme that may not be suited to the conditions experienced by the UE.

As described herein, a UE may adjust a TA according to at least one TA adjustment scheme dynamically configured by the base station. In such cases, a UE may transmit information (e.g., related to changes in environmental conditions surrounding the UE, a UE capability for adjusting a TA, a mobility mode of the UE, or a combination thereof) to a base station, which the base station may use to select a TA adjustment scheme from a set of TA adjustment schemes for an uplink transmission from the UE to the base station. For example, if the UE is in a high speed mobility scenario, the base station may select a TA adjustment scheme in which the UE autonomously adjusts the TA. The base station may dynamically configure the UE to autonomously adjust a TA based on one or more conditions being met (e.g., such as when a receive timing is greater than a threshold). In such cases, the UE may inform the base station of the autonomous TA adjustment (e.g., the current TA value utilized by the UE). In some cases, the UE may not inform the base station of the autonomous TA adjustment. In some examples, the UE may propose a TA adjustment to the base station (e.g., based on measuring one or more synchronization signal blocks (SSBs), a configured algorithm, or the like) and may receive, in response, an approval message from the base station. The UE may then adjust the TA after receiving the approval. The base station may transmit an indication of the TA adjustment scheme, so that the UE and the base station may communicate according to the TA adjustment based on the scheme. For example, the UE may transmit an uplink message based on adjusting the TA for a duration. The dynamic configuration of TA adjustments at the UE may provide greater flexibility and control to enable efficient timing modifications for communications between the devices.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to dynamic TA adjustment schemes.

FIG. 1 illustrates an example of a wireless communications system 100 that supports dynamic TA adjustment schemes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may transmit signaling to a base station 105 that includes a TA value, which may enable the base station 105 to receive the signaling within a frame or subframe boundary (e.g., at the same time in a synchronized system). The TA value may equal an RTT between the UE 115 and the base station 105, which may include the time between transmission and reception of a signal. In some cases, the RTT may change due to changes in the UE 115 location, changes in the UE 115 environment, or both. The base station 105 may transmit a command to the UE 115 to perform a TA adjustment based on the RTT change. In some examples, a UE 115 may perform a receive timing adjustment, which may be different than a TA adjustment. The UE 115 may perform the receive timing adjustment based on changes to one or more parameters of received SSBs. For example, the UE 115 may perform the receive timing adjustment if a value of a parameter exceeds a threshold value, a difference between values of SSB parameters exceed a threshold value, or the like. In some cases, such as when the UE 115 changes location or the channel environment changes, the UE 115 may perform the TA adjustment, a receive timing adjustment, or both. For example, the UE 115 may autonomously adjust a TA value, which may decrease the signaling overhead at the base station 105. However, the UE 115 may autonomously adjust the TA value at an unnecessarily high frequency (e.g., too often), which may cause unnecessary power consumption at the UE 115.

Wireless communications system 100 may support techniques that enable a base station 105 to select a TA adjustment scheme from a set of TA adjustment schemes. For example, a base station 105 may configure a UE 115 to use a TA adjustment scheme based on different signaling scenarios, which may reduce unnecessary TA adjustments at the UE 115. In some cases, the UE 115 may transmit a capability or mobility mode indication to the base station 105 (e.g., include a timing accuracy of the UE 115, mobility information of the UE 115, a mobility mode, a capability of the UE to operating using the one or more of the TA adjustment schemes, or a combination thereof). In some examples, the base station 105 may receive the capability or mobility mode indication from the UE 115 and may select a TA adjustment scheme based on the information included in the indication.

For example, if the UE 115 is in a high-mobility mode, the base station 105 may select a TA adjustment scheme in which the UE 115 autonomously performs a TA adjustment. In some examples, the base station 105 may select a TA adjustment scheme in which the UE 115 adjusts a TA value after receiving a command from the base station 105. In some examples, the base station 105 may select a TA adjustment scheme in which the UE 115 may transmit a message to the base station 105 including a proposed TA adjustment, and the UE 115 may adjust the TA value after receiving an approval message from the base station 105. In some cases, base station 105-a may transmit a TA adjustment scheme configuration to the UE 115, which may include an indication of the selected TA adjustment scheme. In some examples, the UE 115 may adjust a TA value for an uplink transmission based on applying the TA adjustment scheme.

Figure 2:
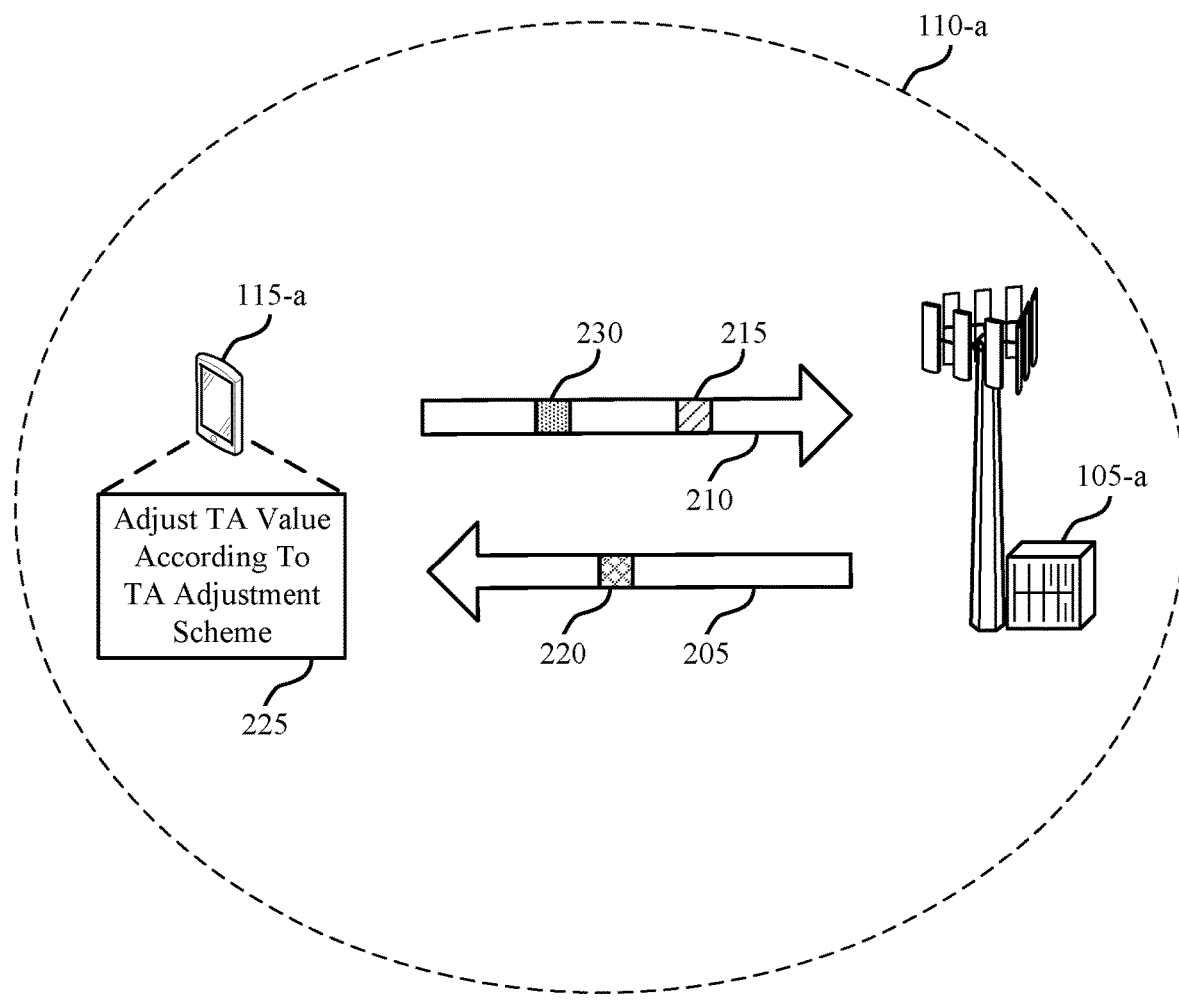
Figure 2:
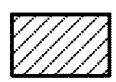
Figure 2:
Figure 2:

FIG. 2 illustrates an example of a wireless communications system 200 that supports dynamic TA adjustment schemes in accordance with aspects of the present disclosure. In some examples, the wireless communications system 200 may implement aspects of the wireless communications system 100 and may include UE 115-a and base station 105-a with coverage area 110-a, which may be examples of a UE 115 and a base station 105 with a coverage area 110 as described with reference to FIG. 1. In some cases, UE 115-a may communicate with base station 105-a by receiving control signaling or data via downlink communication link 205, transmitting control signaling or data via uplink communication link 210, or both. For example, base station 105-a may configure UE 115-a with a TA adjustment scheme to update a TA value for an uplink transmission from UE 115-a to base station 105-a.

In some examples, UE 115-a may transmit signaling to base station 105-a that includes a TA value, which may enable base station 105-a to receive the signaling within a frame or subframe boundary (e.g., at the same time in a synchronized system). The TA value may equal an RTT between UE 115-a and base station 105-a, which may include the time between transmission and reception of a signal, such as a feedback message (e.g., an acknowledgment (ACK) message). In some cases, the RTT may change due to changes in a location of UE 115-a, changes in the environment at or near UE 115-a, or both. The base station 105 may transmit a command to UE 115-a to perform a TA adjustment based on the RTT change. For example, the RTT may increase in some scenarios, such as when UE 115-a moves away from base station 105-a (e.g., in scenarios where UE 115-a may be travelling relatively fast, such as when located on a high-speed train), and base station 105-a may transmit a command to UE 115-a to increase the TA value.

In some examples, UE 115-a may perform a receive timing adjustment, which may be different than a TA adjustment. UE 115-a may perform the receive timing adjustment based on changes to one or more parameters (e.g., a reference signal received power (RSRP), a location of UE 115-a, or the like) of received SSBs. For example, UE 115-a may perform the receive timing adjustment if a value of a parameter exceeds a threshold value, a difference between values of SSB parameters exceed a threshold value, or the like. The value of the parameters of one or more SSBs may be different due to errors in the timing clock of UE 115-a, changes to downlink transmission timing made by base station 105-a (e.g., via medium access control-control element (MAC-CE)), changes in location of UE 115-a, changes in a channel environment (e.g., a channel may change from a line-of-sight (LOS) channel to a non-line-of-sight (NLOS) channel), or a combination thereof. In some examples, UE 115-*a* may perform the receive timing adjustment more frequently or less frequently based on the speed, environment, or both, of UE 115-*a*. For example, UE 115-*a* may perform the receive timing adjustment less often when UE 115-*a* moves around at a relatively low speed when compared with a relatively high speed application (e.g., a high-speed train). In some cases, such as when UE 115-*a* changes location or the channel environment changes, UE 115-*a* may perform the TA adjustment in addition to, or as an alternative to, performing a receive timing adjustment. In some examples, the change in location of UE 115-*a* or the change in the channel environment may trigger UE 115-*a* to perform the TA adjustment. Additionally or alternatively, the receive timing adjustment performed by UE 115-*a* may trigger UE 115-*a* to perform the TA adjustment.

In some examples, UE 115-*a* may autonomously perform a TA adjustment when a receive timing difference between received SSBs is less than a threshold, which may be referred to as a gradual timing adjustment, or is greater than a threshold, which may be referred to as a one-shot timing adjustment. For example, the receive timing difference between SSBs may be the difference in reception time at UE 115-*a* before and after the one-shot timing adjustment, in accordance with $\Delta T=|T_1-T_2|$, where $\Delta T$ may be the receive timing difference, $T_1$ may be the reception time at the UE before the one-shot timing adjustment, and $T_2$ may be the reception time used after the one-shot timing adjustment. In some cases, when UE 115-*a* performs a one-shot timing adjustment, the TA adjustment value may be based on the receive timing adjustment (e.g., twice the receive timing adjustment). For example, UE 115-*a* transmit timing may change after the one-shot timing adjustment based on $T_2-(N_{TA}+N_{TA\ offset})+2\times(T_1-T_2)$, where $N_{TA}=TA\times16$, TA may be the TA value, and $N_{TA\ offset}$ may be a time offset from $N_{TA}$.

In some examples, UE 115-*a* may perform a one-shot timing adjustment to reduce signaling overhead when the base station 105 transmits a command to UE 115-*a* to adjust a TA value, which may be desirable in scenarios where UE 115-*a* may be moving around frequently, rapidly, or both. For example, UE 115-*a* may be moving at high speed or located on a high-speed vehicle, such as a high-speed train (e.g., moving at 500 kilometers per hour (km/h)), and may receive a transmission including one or more symbols. UE 115-*a* may autonomously adjust the TA value when a timing error of the one or more symbols exceeds a threshold value, which may be configured at UE 115-*a* (e.g., one-fourth of a maximum timing error (e.g., 0.097 microseconds)). The signaling overhead at base station 105-*a* and UE 115-*a* may decrease due to UE 115-*a* autonomously adjusting the TA value at a relatively frequent periodicity (e.g., every 50 milliseconds) instead of receiving multiple commands from base station 105-*a* to adjust the TA value. In some examples, multiple UEs 115 may be moving at high speed or located on the high-speed vehicle, and each UE 115 may autonomously adjust each respective TA value, which may further decrease the signaling overhead at base station 105-*a*. However, UE 115-*a* autonomously adjusting the TA value may be unnecessary and may introduce errors in communication between UE 115-*a* and base station 105-*a* in cases where the receive timing difference changes due to causes other than changes to the location of UE 115-*a* (e.g., due to errors in the timing clock of the UE 115 or an IAB node, changes to downlink transmission timing made by base station 105-*a*, or the like). For example, an unnecessarily adjusted TA value may cause a disruption to the synchronized signaling at base station 105-*a*, may cause unnecessary power consumption at UE 115-*a*, or both.

In some examples, base station 105-*a* may dynamically configure UE 115-*a* to use a TA adjustment scheme based on different environments, conditions, deployments, or signaling scenarios, which may reduce unnecessary TA adjustments at UE 115-*a*, reduce signaling overhead, or both. For example, in cases where UE 115-*a* is moving at a relatively high speed, base station 105-*a* may configure UE 115-*a* with a different TA adjustment scheme than other cases where UE 115-*a* is moving at a relatively slow speed (e.g., in an IAB network). In some cases, UE 115-*a* may transmit a message including a capability or mobility mode indication 215 to base station 105-*a* via uplink communication link 210 (e.g., via a downlink control information (DCI) message, RRC signaling, a MAC-CE, or the like). The capability or mobility mode indication 215 may include at least one of a capability mode or a mobility mode at UE 115-*a*. For example, the capability or mobility mode indication 215 may include capability information for one or more TA adjustment schemes, such as a timing accuracy (e.g., a timing clock accuracy) of UE 115-*a*, mobility information (e.g., changes in position, environmental conditions, or the like) of UE 115-*a*, a mobility mode (e.g., a high-speed mode, a low-speed mode, or the like), a capability of the UE to operating using the one or more of the TA adjustment schemes, or any combination thereof.

Base station 105-*a* may receive the capability or mobility mode indication 215 from UE 115-*a*, and may select a TA adjustment scheme based on the information included in the indication. In some examples, base station 105-*a* may select a TA adjustment scheme in which UE 115-*a* adjusts a TA value after receiving a command from base station 105-*a*, which is described in further detail with respect to FIG. 3. In some other examples, if UE 115-*a* is in a high-mobility mode, base station 105-*a* may select a TA adjustment scheme in which UE 115-*a* autonomously performs a TA adjustment, which is described in further detail with respect to FIG. 4. In some cases, UE 115-*a* may transmit a message informing base station 105-*a* of the autonomous TA adjustment. In some other cases, UE 115-*a* may not transmit a message informing base station 105-*a* of the autonomous TA adjustment. In some examples, base station 105-*a* may select a TA adjustment scheme in which UE 115-*a* may transmit a message to base station 105-*a* including a proposed TA adjustment, and UE 115-*a* may adjust the TA value after receiving an approval message from base station 105-*a*, which is described in further detail with respect to FIG. 5. In some cases, UE 115-*a* may determine a TA adjustment value based on measuring one or more SSB parameters (e.g., an RSRP value, parameters related to the location of UE 115-*a*, or both). Additionally or alternatively, base station 105-*a* may configure UE 115-*a* with one or more algorithms (e.g., machine learning algorithms) that use the RSRP values of the SSBs to determine TA values for adjustment.

In some cases, base station 105-*a* may transmit a message including a TA adjustment scheme configuration 220 to UE 115-*a* via downlink communication link 205, which may include an indication of the selected TA adjustment scheme. Base station 105-*a* may transmit a TA adjustment scheme configuration 220 after receiving the capability or mobility mode indication 215 and determining that UE 115-*a* is in a given mobility mode, a given environment, or is otherwise capable of supporting the TA adjustment scheme. UE 115-*a* may apply the TA adjustment scheme by adjusting a TA value for an uplink transmissions to base station 105-*a* based on receiving a command from base station 105-*a*, autonomously, based on proposing a TA value to base station 105-*a*, or the like. In some examples, UE 115-*a* may adjust the TA value (e.g., increase the TA value, decrease the TA value, or maintain the TA value) due to a change in location of UE 115-*a*, a change in a mobility mode of UE 115-*a*, a change in a channel environment, a receive timing difference of SSBs being greater than a threshold, or the like. For example, UE 115-*a* may be dynamically configured with a TA adjustment scheme in which UE 115-*a* may adjust the TA value after receiving a command from base station 105-*a*. Base station 105-*a* may refrain from transmitting a command to UE 115-*a* to adjust the TA value when an error in the timing clock at UE 115-*a* causes a receive timing difference between SSBs, and UE 115-*a* may thus maintain the TA value. UE 115-*a* may transmit an uplink message 230 to base station 105-*a* via uplink communication link 210, where the uplink message 230 may have the adjusted TA value applied when transmitted. Base station 105-*a* may receive the uplink message 230 within a similar frame or subframe as other uplink transmissions from other UEs 115.

In some cases, UE 115-*a* may transmit, to base station 105-*a*, the report indicating a TA adjustment value (e.g., such as when UE 115-*a* autonomously adjusted its TA) or indicating one or more preferred TA adjustment values, and UE 115-*a* may wait some amount of time for an acknowledgment (e.g., an ACK or some feedback message) of the report from base station 105-*a*. The ACK may include an ACK to a message transmitted over an uplink channel (e.g., PUSCH, PUCCH) carrying the report. Additionally or alternatively, the ACK may include another TA command from base station 105-*a*. In other examples, if no ACK is received from base station 105-*a* within some time period, UE 115-*a* may resend the report to base station 105-*a*.

In cases where UE 115-*a* indicates a requested TA adjustment value via the report, and UE 115-*a* subsequently receives a message approving or configuring the requested TA adjustment value, the TA adjustment may be applied some amount of time after receiving the ACK from base station 105-*a*. In some examples, if the ACK received from base station 105-*a* is an ACK for the uplink channel (e.g., PUSCH, PUCCH) over which the report was transmitted, UE 115-*a* may apply the requested TA value. That is, the ACK may serve as the approval of the requested TA adjustment value. In other cases, such as when the ACK is another TA command from base station 105-*a*, UE 115-*a* may apply the TA adjustment value indicated in the TA command.

In cases where UE 115-*a* autonomously applies a TA adjustment value and reports the TA adjustment value to base station 105-*a*, UE 115-*a* may receive an ACK in response to the report. If the ACK received by UE 115-*a* is a TA command (e.g., a new or additional TA command), there may be some issues if UE 115-*a* also receives a TA adjustment command after (e.g., immediately after) autonomously adjusting its TA but before receiving the ACK for the report (including an indication of the autonomous TA adjustment). In such cases, UE 115-*a* may be unaware of which TA value may be used for the TA adjustment (e.g., the TA value before UE 115-*a* applies the autonomous TA adjustment or the TA value (in the command) received after the TA adjustment is reported). Accordingly, a TA command received by UE 115-*a* prior to receiving an acknowledgment to the reported TA value may be meant for a TA value signaled prior to the autonomous TA adjustment (e.g., an old TA).

Figure 3:
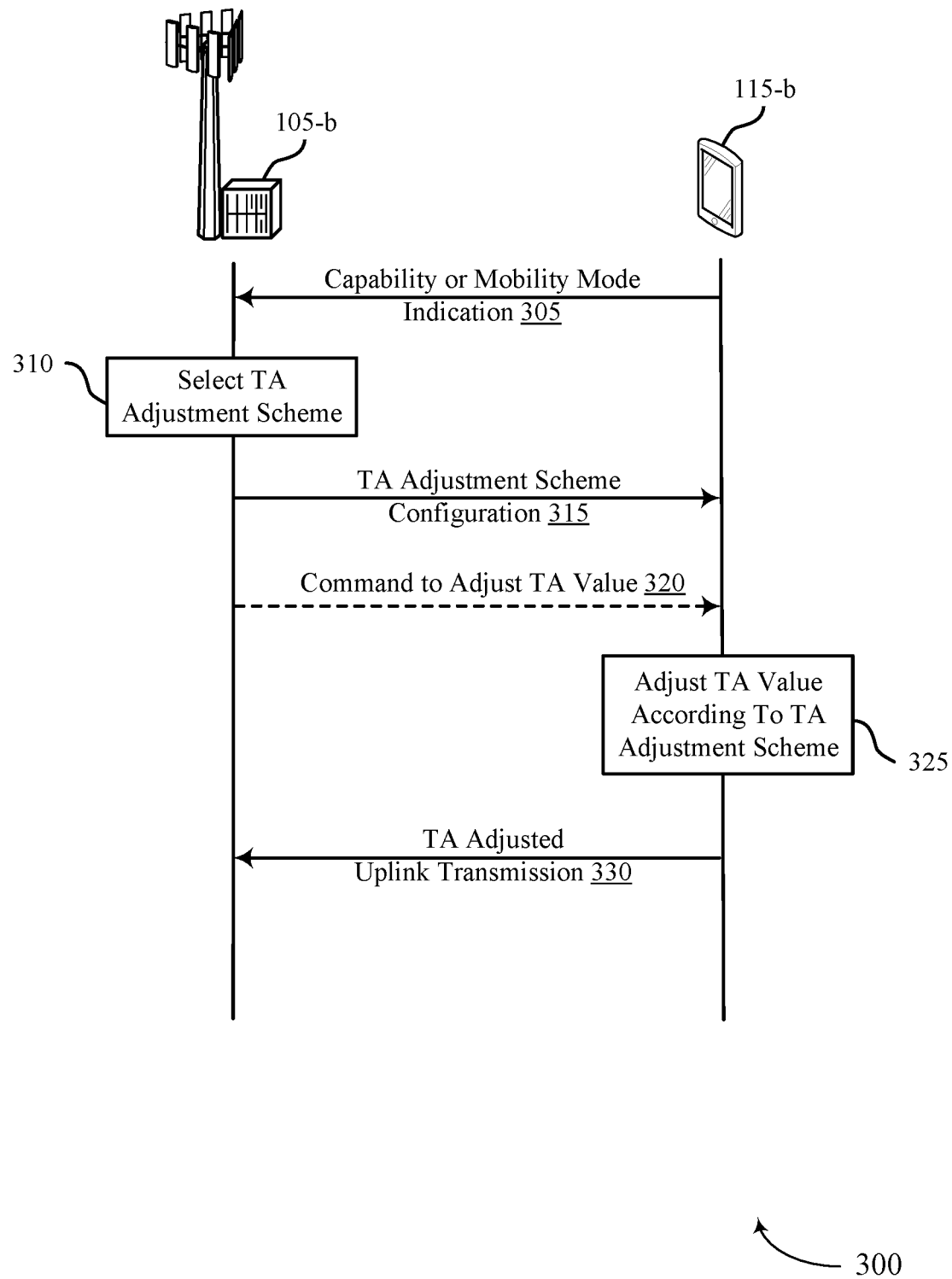
FIGS. 3 through 5 illustrate examples of process flows in a system that supports dynamic TA adjustment schemes in accordance with aspects of the present disclosure.

FIG. 3 illustrates an example of a process flow 300 in a system that supports dynamic TA adjustment schemes in accordance with aspects of the present disclosure. In some examples, process flow 300 may implement aspects of the wireless communications system 100 or the wireless communications system 200. The process flow 300 may illustrate an example of a base station 105, such as base station 105-*b*, configuring a UE 115, such as UE 115-*b*, with a TA adjustment scheme based on a capability or mobility mode of the UE 115. For example, base station 105-*b* may configure UE 115-*b* to adjust a TA value after receiving a command from base station 105-*a*. Alternative examples of the following may be implemented, where some processes are performed in a different order than described or are not performed. In some cases, processes may include additional features not mentioned below, or further processes may be added.

At 305, UE 115-*b* may transmit information for a TA adjustment procedure at UE 115-*b* to base station 105-*b*. For example, UE 115-*b* may transmit at least one of a UE capability or mobility mode of UE 115-*b*. In some cases, the information may include a capability for the UE to support one or more TA adjustment schemes, one or more environmental conditions associated with the UE, or both.

At 310, base station 105-*b* may select a TA adjustment scheme based on the information from UE 115-*b*. For example, base station 105-*b* may select a TA adjustment scheme in which UE 115-*b* adjust a TA value based on receiving a command from base station 105-*b*.

At 315, base station 105-*b* may transmit an indication of the selected TA adjustment scheme to UE 115-*b*. For example, base station 105-*b* may dynamically configure UE 115-*b* with the TA adjustment scheme (e.g., via a DCI message).

At 320, UE 115-*b* may receive a command to perform the TA adjustment procedure from base station 105-*b*. The command may include an indication of a TA adjustment value for the TA adjustment procedure at UE 115-*b*. The TA adjustment value may be based on at least one of the UE capability or mobility mode. For example, UE 115-*b* may receive a message from base station 105-*b* configuring the indicated TA adjustment value.

At 325, UE 115-*b* may apply a TA adjustment value to an uplink message to base station 105-*b*. For example, UE 115-*b* may adjust a TA value based on the TA value indicated in the command from base station 105-*b*. That is, UE 115-*b* may determine the TA adjustment value based on at least one of the UE capability or mobility mode and the command from base station 105-*b*. UE 115-*b* may perform the TA adjustment procedure using the determined TA adjustment value, which may be indicated in the command from base station 105-*b*.

At 330, UE 115-*b* may transmit the uplink transmission based on adjusting the TA value at 325.

Figure 4:
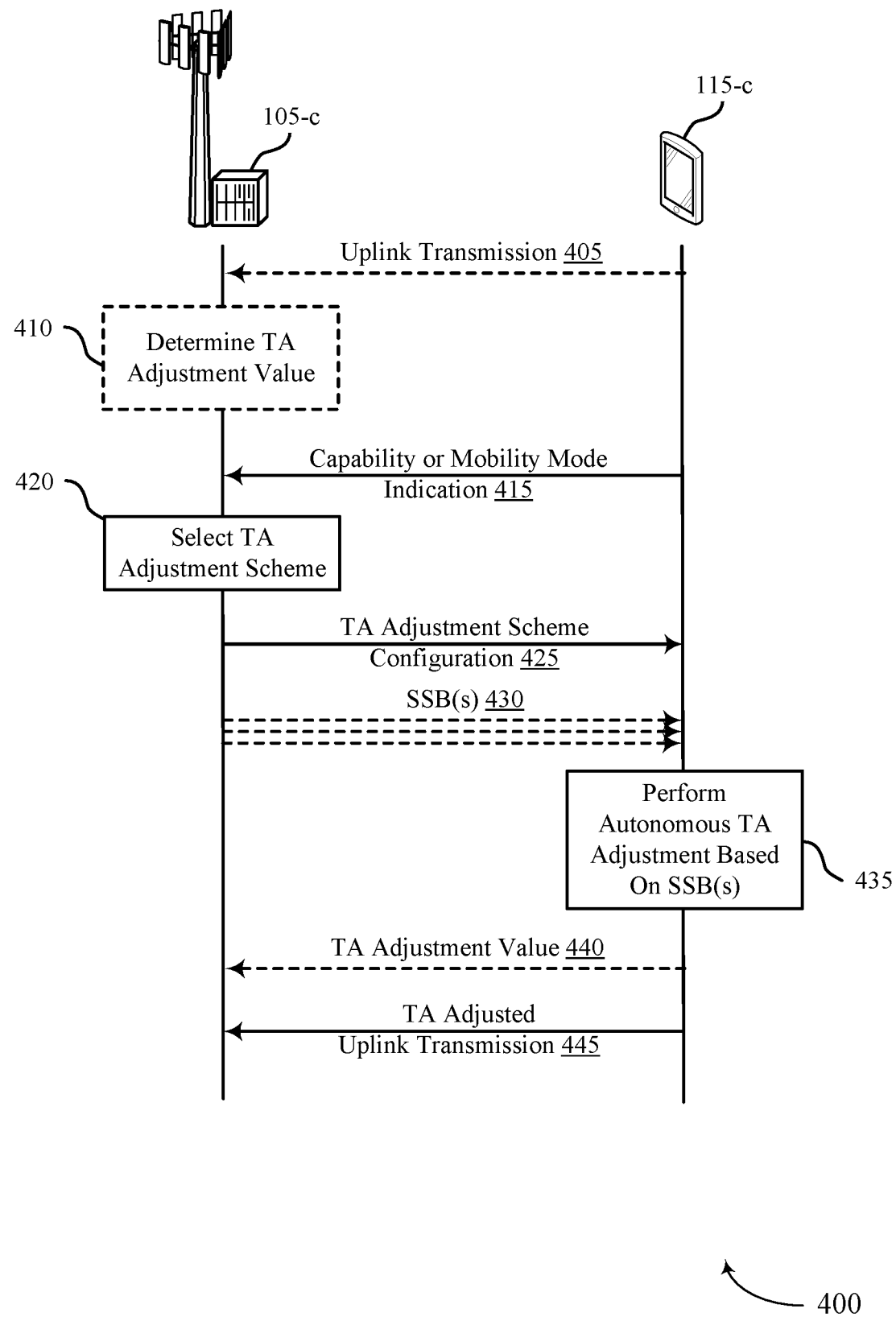

FIG. 4 illustrates an example of a process flow 400 in a system that supports dynamic TA adjustment schemes in accordance with aspects of the present disclosure. In some examples, process flow 400 may implement aspects of the wireless communications system 100, the wireless communications system 200, the process flow 300, or a combination thereof. The process flow 400 may illustrate an example of a base station 105, such as base station 105-*c*, configuring a UE 115, such as UE 115-*c*, with a TA adjustment scheme based on a capability or mobility mode of the UE 115. For example, base station 105-*c* may configure UE 115-*c* to autonomously adjust a TA value. Alternative examples of the following may be implemented, where some processes are performed in a different order than described or are not performed. In some cases, processes may include additional features not mentioned below, or further processes may be added.

At 405, UE 115-c may perform an uplink transmission (e.g., transmit an uplink message) to base station 105-c, where the uplink transmission may have a TA value applied (which may be an original TA value previously configured by base station 105-c and signaled to UE 115-c). In some cases, however, UE 115-c may perform an autonomous TA adjustment (e.g., after the transmission at 405) based on SSB parameters (e.g., an RSRP for one or more SSBs). In such cases, base station 105-c may be unaware of the autonomous TA adjustment at UE 115-c. For example, base station 105-c may assume UE 115-c uses the original TA value for TA adjustment procedures prior to and including the uplink transmission at 405, which base station 105-c may have estimated based on a previous uplink transmission.

At 410, base station 105-c may determine a TA adjustment value for UE 115-c based on the uplink transmission with the original TA value, based on an uplink reception window (e.g., a window size, which may be unknown by UE 115-c), or the like. For example, base station 105-c may determine UE 115-c is to update the TA adjustment value based on one or more previous uplink transmissions (e.g., a sounding reference signal (SRS) transmission or a physical uplink control channel (PUCCH) transmission), and may transmit an indication for UE 115-c to adjust the TA value without knowing UE 115-c may have already autonomously adjusted its own TA value. In some cases, base station 105-c may transmit a downlink control channel order (e.g., a physical downlink control channel (PDCCH) order) to trigger a transmission of, for example, a signal over a physical random access channel (PRACH) that may be used for TA measurement, which may be unnecessary if UE 115-c autonomously adjusted the TA value.

In some examples, at 415, UE 115-c may transmit information for a TA adjustment procedure at UE 115-c to base station 105-c. For example, UE 115-c may transmit at least one of a UE capability or mobility mode of UE 115-c, as described with reference to FIGS. 2 and 3.

At 420, base station 105-c may select a TA adjustment scheme based on the information from UE 115-c. For example, base station 105-c may select a TA adjustment scheme in which UE 115-c autonomously adjusts a TA value (e.g., if UE 115-c is in a high-mobility mode). Thus, base station 105-c may be aware of the autonomous TA adjustment at UE 115-c.

At 425, base station 105-c may transmit an indication of the selected TA adjustment scheme to UE 115-c. For example, base station 105-c may dynamically configure UE 115-c with the TA adjustment scheme (e.g., via a DCI message). In some cases, UE 115-c may autonomously perform the TA adjustment based on the indication.

For example, at 430, UE 115-c may receive one or more SSBs, and may determine a TA adjustment value for the autonomous TA adjustment procedure based on the SSBs. In some cases, UE 115-c may measure one or more parameters from multiple SSBs, where the one or more parameters include an RSRP, a location of the UE, or both. UE 115-c may calculate the TA adjustment value based at least in part on the one or more parameters.

At 435, UE 115-c may apply a TA adjustment value to an uplink message to base station 105-c. For example, UE 115-c may autonomously adjust a TA value, UE 115-c may determine the TA adjustment value based on at least one of the UE capability or mobility mode. UE 115-c may perform the TA adjustment procedure using the autonomously determined TA adjustment value. In some examples, UE 115-c may receive a message from base station 105-c configuring an indicated TA adjustment value. UE 115-c may perform a TA adjustment procedure based on receiving the message configuring the indicated TA adjustment value. In addition, UE 115-c may refrain from applying the autonomously determined TA value or from transmitting an indication of the autonomously determined TA value for a duration based on receiving the message configuring the TA adjustment value.

In some cases, at 440, UE 115-c may transmit a message informing base station 105-a of the autonomous TA adjustment. For example, UE 115-c may transmit an indication of the determined TA adjustment value based on performing the TA adjustment procedure at 435. UE 115-c may transmit the indication of the determined TA adjustment value using uplink control information (UCI) over an uplink shared channel (e.g., a PUCCH, a physical uplink shared channel (PUSCH), or the like), UCI over an uplink control channel, a MAC-CE, or any combination thereof. In some cases, UE 115-c may transmit the MAC-CE in a PUSCH scheduled by an uplink grant (e.g., a known uplink grant). In some other cases, UE 115-c may transmit a scheduling request to base station 105-c to request a new grant in the PUSCH to send the MAC-CE. The TA adjustment value indicated in the UE request or report may follow the same indication rule as the TA adjustment indication in a base station side TA adjustment command. In some examples, UE 115-c may indicate the TA reporting per beam, per antenna panel, per transmission reception point (TRP), per beam group, per TA group, or any combination thereof. For example, a beam, a panel, a TRP, a beam group ID, or a combination thereof may be included in the TA adjustment value report from UE 115-c. In some cases, the TA adjustment scheme may be configured for one or more transmit beams (e.g., for the beam), the antenna panel, the TRP, the beam group, the TA group, or any combination thereof. In some other cases, UE 115-c may not transmit a message informing base station 105-a of the autonomous TA adjustment.

UE 115-c may receive a configuration of a TA adjustment value from base station 105-c after transmitting the indication of the TA adjustment value to base station 105-c. UE 115-c may perform an additional TA adjustment procedure using the configured TA adjustment value. For example, UE 115-c may perform the additional TA adjustment procedure based on determining that the configuration of the TA adjustment value is received within a threshold time period after transmitting the indication of the TA adjustment value at 440. In some cases, UE 115-c may refrain from requesting or applying an autonomous TA adjustment for a time period after receiving the TA adjustment configuration (e.g., a command) from base station 105-c. In some examples, if base station 105-c already requested for UE 115-c to send a signal (e.g., based on a PDCCH order) that base station 105-c may potentially use for TA measurement, UE 115-c may hold its autonomous TA adjustment or request for a time period. For example, if UE 115-c receives a downlink control channel order from base station 105-c for performing a random access procedure, UE 115-c may refrain from performing the TA adjustment procedure using the determined TA adjustment value based on the downlink control channel order being received within a threshold time period of determining the TA adjustment value.

In some cases, if UE 115-c receives a TA adjustment command from base station 105-c, then UE 115-c may apply a TA adjustment based on the command. In some other cases, if UE 115-c does not receive a TA adjustment command from base station 105-*c* in the time period, then UE 115-*c* may apply or request a new TA adjustment value after the time period. At 445, UE 115-*c* may transmit the uplink message based on adjusting the TA value at 435.

Figure 5:
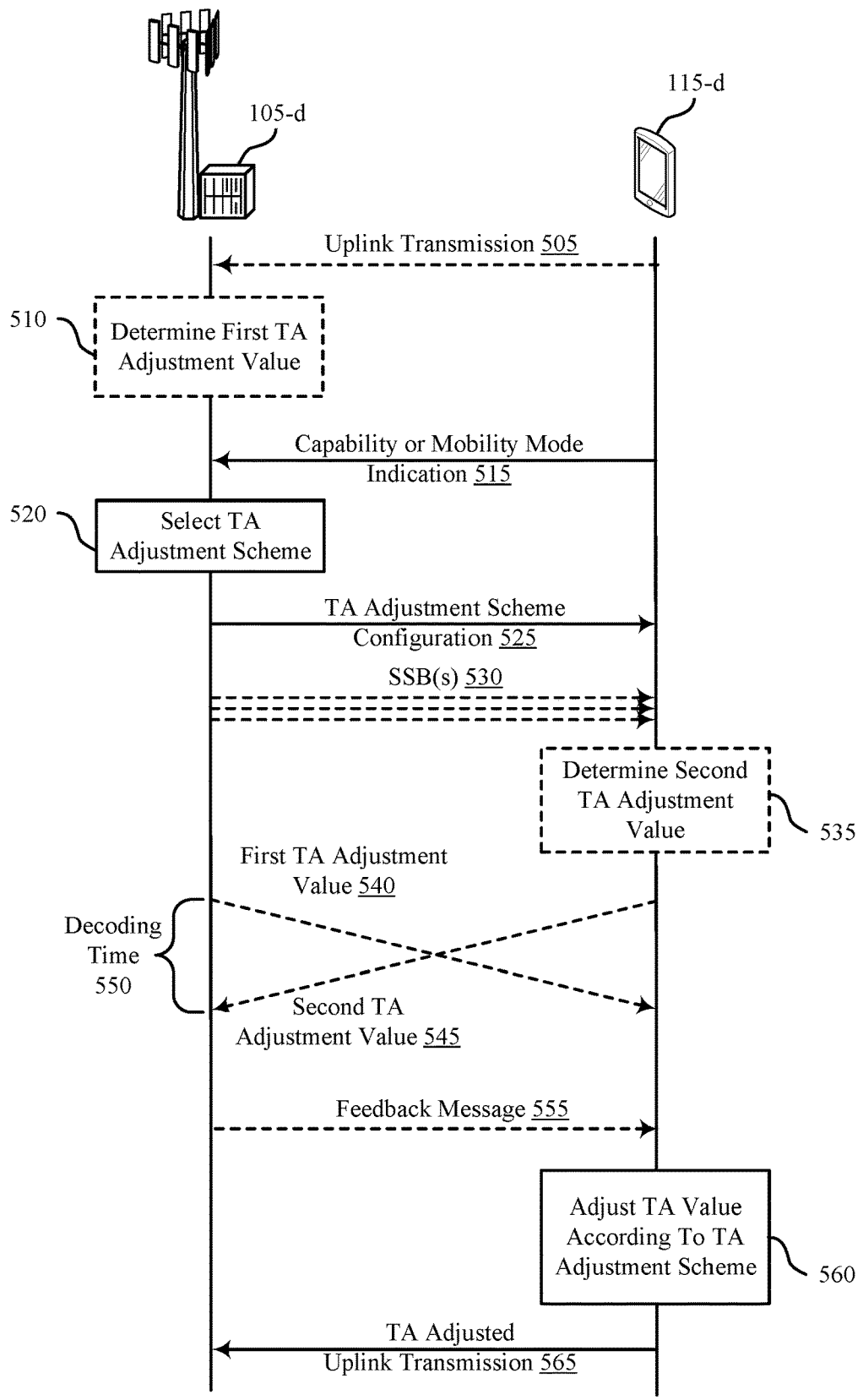

FIG. 5 illustrates an example of a process flow 500 in a system that supports dynamic TA adjustment schemes in accordance with aspects of the present disclosure. In some examples, process flow 500 may implement aspects of the wireless communications system 100, the wireless communications system 200, the process flow 300, the process flow 400, or a combination thereof. The process flow 500 may illustrate an example of a base station 105, such as base station 105-*d*, configuring a UE 115, such as UE 115-*d*, with a TA adjustment scheme based on a capability or mobility mode of the UE 115. For example, base station 105-*d* may configure UE 115-*d* to transmit a message to base station 105-*d* including a proposed TA adjustment, and UE 115-*d* may adjust the TA value after receiving an approval message from base station 105-*d*. Alternative examples of the following may be implemented, where some processes are performed in a different order than described or are not performed. In some cases, processes may include additional features not mentioned below, or further processes may be added.

At 505, UE 115-*d* may perform an uplink transmission to base station 105-*d* using an original TA value (e.g., a TA value that was previously indicated to UE 115-*d*).

At 510, base station 105-*d* may determine a first TA adjustment value for UE 115-*d* based on the uplink transmission with the original TA value, based on an uplink reception window (e.g., a window size, which may be unknown by UE 115-*d*), or the like. For example, base station 105-*d* may determine UE 115-*d* is to update the TA adjustment value based on one or more previous uplink transmissions (e.g., an SRS transmission or PUCCH transmission).

In some examples, at 515, UE 115-*d* may transmit information for a TA adjustment procedure at UE 115-*d* to base station 105-*d*. For example, UE 115-*d* may transmit at least one of a UE capability or mobility mode of UE 115-*d*.

At 520, base station 105-*d* may select a TA adjustment scheme based on the information from UE 115-*d*. For example, base station 105-*d* may select a TA adjustment scheme in which UE 115-*d* transmits a message to base station 105-*d* including a proposed TA adjustment, and UE 115-*d* may adjust the TA value after receiving an approval message (e.g., a feedback message) from base station 105-*d*.

At 525, base station 105-*d* may transmit an indication of the selected TA adjustment scheme to UE 115-*d*. For example, base station 105-*d* may dynamically configure UE 115-*d* with the TA adjustment scheme (e.g., via a DCI message).

In some cases, at 530, UE 115-*d* may receive one or more SSBs, and may determine a second TA adjustment value for the TA adjustment procedure based on the SSBs. For example, at 535, UE 115-*d* may measure one or more parameters from multiple SSBs, where the one or more parameters include an RSRP, a location of the UE, or both. UE 115-*d* may calculate the second TA adjustment value based at least in part on the one or more parameters.

At 540 and 545, base station 105-*d* and UE 115-*d* may transmit an indication of the first TA adjustment value (e.g., in a TA adjustment command) and the second TA adjustment value (e.g., in a TA adjustment report or request) to UE 115-*d* and base station 105-*d*, respectively. In some examples, if UE 115-*d* transmits the TA adjustment report or request a number of symbols (e.g., a decoding time 550) before receiving the TA adjustment command from base station 105-*d*, then base station 105-*d* may discard the report or request. The decoding time, or the number of symbols, may be the time UE 115-*d* uses to decode the TA adjustment command. In some cases, UE 115-*d* may transmit the indication of the second TA adjustment value after receiving the TA adjustment command from base station 105-*d* but before decoding the command. In some examples, UE 115-*d* may readjust a TA value based on the TA adjustment command from base station 105-*d*, and UE 115-*d* may use the original TA value plus the TA adjustment in the command.

At 555, base station 105-*d* may transmit a feedback message to UE 115-*d* based on receiving the second TA adjustment value from UE 115-*d*. For example, base station 105-*d* may transmit an ACK message in response to the PUSCH or PUCCH carrying the report including the TA adjustment value. In some cases, UE 115-*d* may monitor for the feedback message from base station 105-*d* for a duration after transmitting the indication of the determined second TA adjustment value. UE 115-*d* may receive the feedback message comprising feedback information from base station 105-*d* and during the duration. In some cases, the feedback message may indicate an additional TA adjustment value.

In some cases, UE 115-*d* may monitor for the feedback message from base station 105-*d* for a duration after transmitting the indication of the determined second TA adjustment value. UE 115-*d* may transmit an additional indication of the determined second TA adjustment value to base station 105-*d* based on failing to receive the feedback message during the duration (e.g., UE 115-*d* may resend the report).

At 560, UE 115-*d* may apply a TA adjustment value to an uplink message to base station 105-*d* based on receiving the feedback message. For example, UE 115-*d* may adjust a TA value based on the second TA adjustment value included in the report to base station 105-*d*. UE 115-*d* may determine the TA adjustment value based on at least one of the UE capability or mobility mode. In some cases, UE 115-*d* may adjust the TA value a duration after receiving the feedback message from base station 105-*d*. For example, if the feedback message is an ACK for the PUSCH or PUCCH, UE 115-*d* may apply the second TA adjustment value. In some examples, if the feedback message indicates an additional TA adjustment value (e.g., is another TA adjustment command), UE 115-*d* may apply the TA adjustment value indicated in the feedback message. For example, UE 115-*d* may perform another TA adjustment procedure using the additional TA adjustment value (e.g., included in the feedback message).

In some cases, if the feedback message indicates the additional TA adjustment value, UE 115-*d* may receive the additional TA adjustment value after adjusting the TA value but before receiving the feedback message. Thus, UE 115-*d* may be unsure of which TA value to adjust (e.g., the TA adjustment value from before or after UE applies an autonomous TA adjustment). In some examples, base station 105-*d* may specify or otherwise configure the behavior at UE 115-*d* such that any TA adjustment command received before the feedback message for the TA adjustment value report is meant for the original TA value.

At 565, UE 115-*d* may transmit the uplink transmission based on adjusting the TA value at 560.

Figure 6:
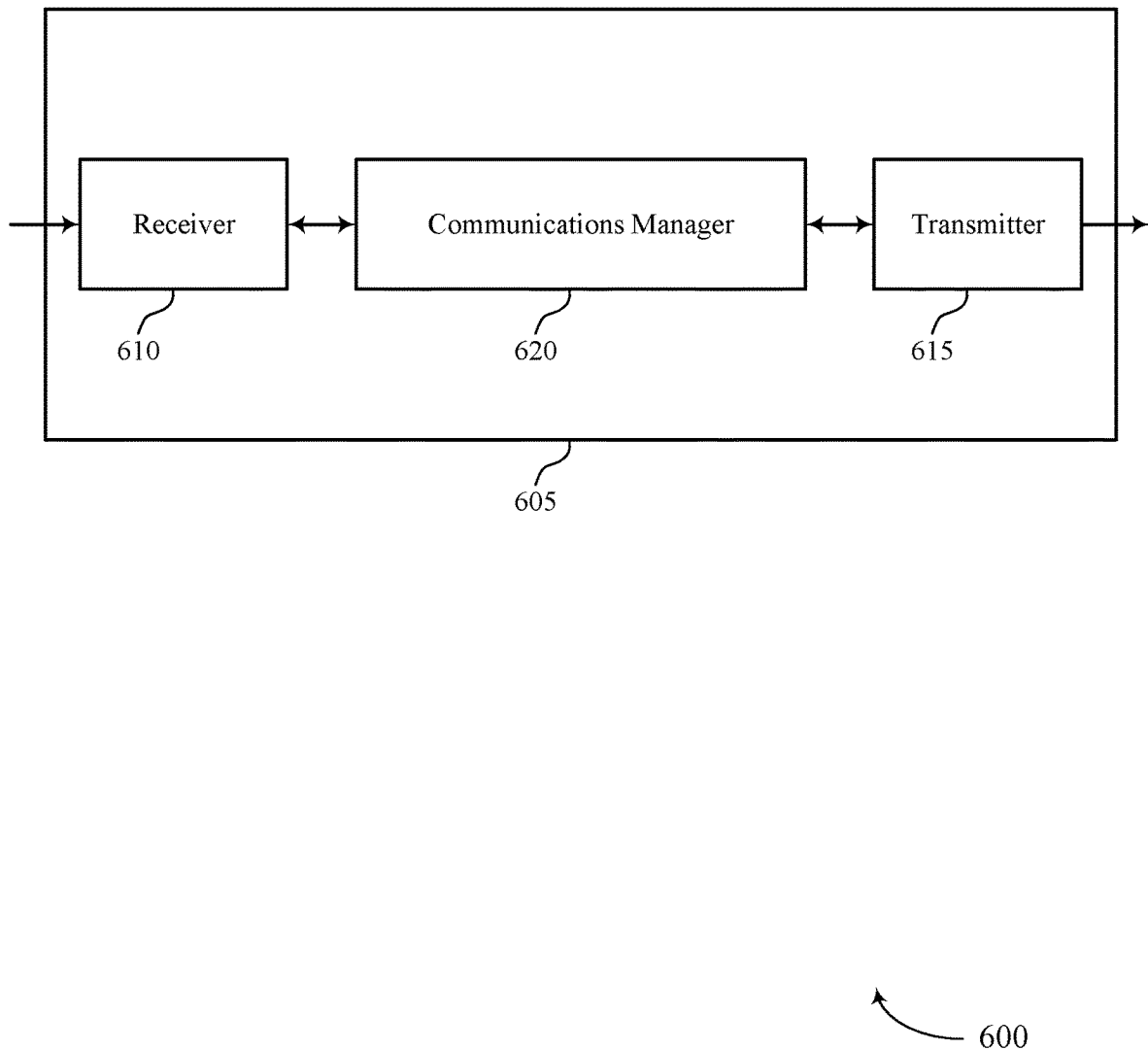
FIGS. 6 and 7 show block diagrams of devices that support dynamic TA adjustment schemes in accordance with aspects of the present disclosure.

FIG. 6 shows a block diagram 600 of a device 605 that supports dynamic TA adjustment schemes in accordance with aspects of the present disclosure. The device 605 may be an example of aspects of a UE 115 as described herein.

The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic TA adjustment schemes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic TA adjustment schemes). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of dynamic TA adjustment schemes as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for transmitting a first message including information associated with a TA adjustment procedure at the UE, where the information includes at least one of a UE capability or mobility mode of the UE. The communications manager 620 may be configured as or otherwise support a means for receiving a second message configuring the UE with a TA adjustment scheme that is from a set of multiple TA adjustment schemes, the TA adjustment scheme being based on the first message. The communications manager 620 may be configured as or otherwise support a means for transmitting an uplink message based on performing the TA adjustment procedure, where the TA adjustment procedure includes applying a TA adjustment value to the uplink message in accordance with the TA adjustment scheme.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, more efficient utilization of communication resources based on the base station 105 selecting a TA adjustment scheme for adjusting a TA value at the UE 115.

Figure 7:
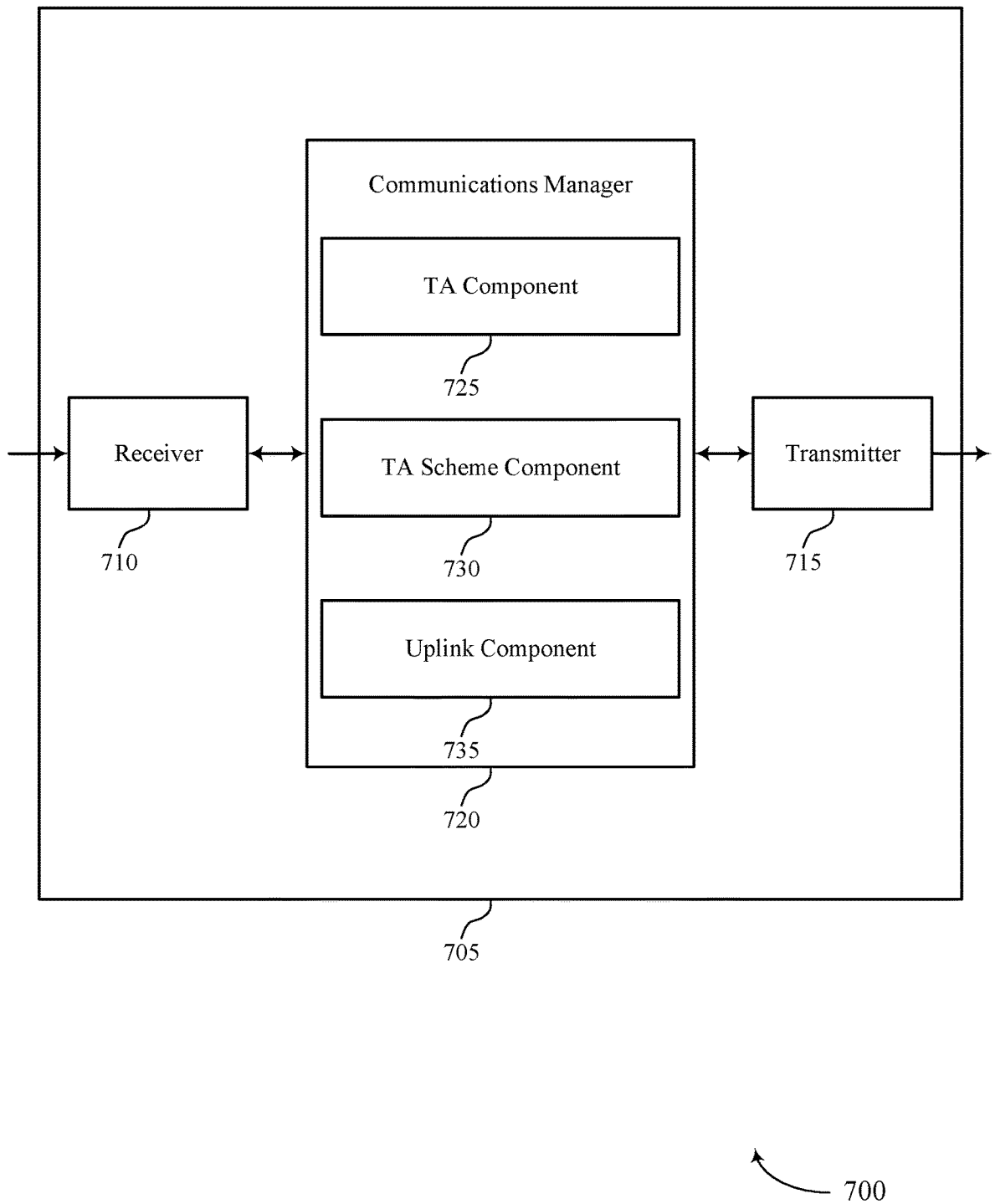

FIG. 7 shows a block diagram 700 of a device 705 that supports dynamic TA adjustment schemes in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic TA adjustment schemes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic TA adjustment schemes). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of dynamic TA adjustment schemes as described herein. For example, the communications manager 720 may include a TA component 725, a TA scheme component 730, an uplink component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The TA component 725 may be configured as or otherwise support a means for transmitting a first message including information associated with a TA adjustment procedure at the UE, where the information includes at least one of a UE capability or mobility mode of the UE. The TA scheme component 730 may be configured as or otherwise support a means for receiving a second message configuring the UE with a TA adjustment scheme that is from a set of multiple TA adjustment schemes, the TA adjustment scheme being based on the first message. The uplink component 735 may be configured as or otherwise support a means for transmitting an uplink message based on performing the TA adjustment procedure, where the TA adjustment procedure includes applying a TA adjustment value to the uplink message in accordance with the TA adjustment scheme.

Figure 8:
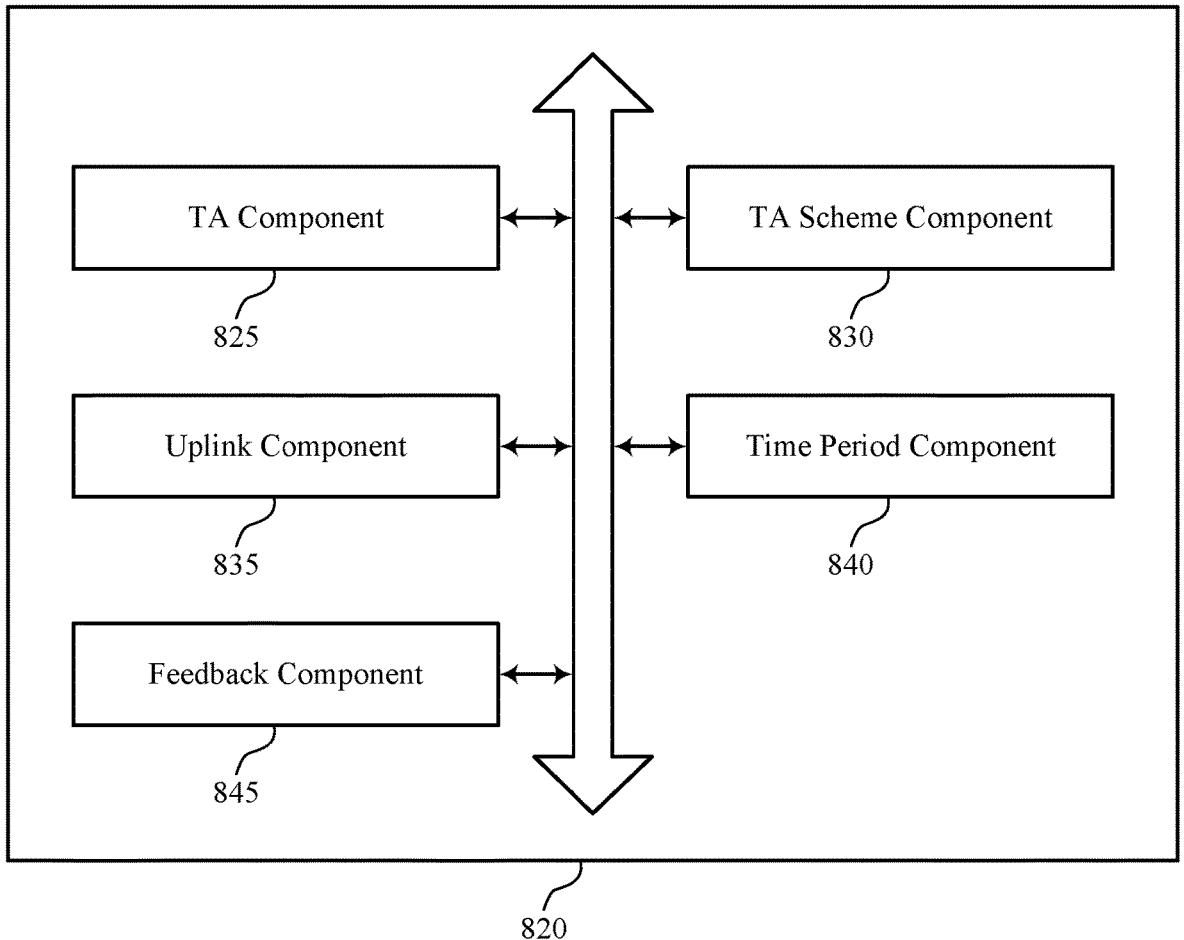
FIG. 8 shows a block diagram of a communications manager that supports dynamic TA adjustment schemes in accordance with aspects of the present disclosure.

FIG. 8 shows a block diagram 800 of a communications manager 820 that supports dynamic TA adjustment schemes in accordance with aspects of the present disclosure. The communications manager 820 may be an example of aspects of a communications manager 620, a communications manager 720, or both, as described herein. The communications manager 820, or various components thereof, may be an example of means for performing various aspects of dynamic TA adjustment schemes as described herein. For example, the communications manager 820 may include a TA component 825, a TA scheme component 830, an uplink component 835, a time period component 840, a feedback component 845, or any combination thereof. Each of these components may communicate, directly or indirectly, with one another (e.g., via one or more buses).

The communications manager 820 may support wireless communications at a UE in accordance with examples as disclosed herein. The TA component 825 may be configured as or otherwise support a means for transmitting a first message including information associated with a TA adjustment procedure at the UE, where the information includes at least one of a UE capability or mobility mode of the UE. The TA scheme component 830 may be configured as or otherwise support a means for receiving a second message configuring the UE with a TA adjustment scheme that is from a set of multiple TA adjustment schemes, the TA adjustment scheme being based on the first message. The uplink component 835 may be configured as or otherwise support a means for transmitting an uplink message based on performing the TA adjustment procedure, where the TA adjustment procedure includes applying a TA adjustment value to the uplink message in accordance with the TA adjustment scheme.

In some examples, to support TA adjustment scheme, the TA component 825 may be configured as or otherwise support a means for determining the TA adjustment value based on the information associated with the TA adjustment procedure. In some examples, to support TA adjustment scheme, the TA component 825 may be configured as or otherwise support a means for performing the TA adjustment procedure using the determined TA adjustment value.

In some examples, to support TA adjustment scheme, the TA component 825 may be configured as or otherwise support a means for transmitting, to a base station, an indication of the determined TA adjustment value.

In some examples, the indication is transmitted based on performing the TA adjustment procedure.

In some examples, the TA component 825 may be configured as or otherwise support a means for receiving, from the base station, a third message configuring the indicated TA adjustment value, where the TA adjustment procedure is performed based on receiving the third message configuring the indicated TA adjustment value.

In some examples, the TA component 825 may be configured as or otherwise support a means for determining a second TA adjustment value based on the information associated with the TA adjustment procedure. In some examples, the TA component 825 may be configured as or otherwise support a means for refraining from applying the second TA adjustment value or transmitting an indication of the second TA adjustment value for a duration based on receiving the third message configuring the indicated TA adjustment value.

In some examples, the TA component 825 may be configured as or otherwise support a means for receiving, from the base station, a configuration of a second TA adjustment value, where the indication of the second TA adjustment value is received after transmitting the indication of the TA adjustment value. In some examples, the TA component 825 may be configured as or otherwise support a means for performing a second TA adjustment procedure using the second TA adjustment value based on the configuration of the second TA adjustment value.

In some examples, the time period component 840 may be configured as or otherwise support a means for determining that the configuration of the second TA adjustment value is received within a threshold time period after transmitting the indication of the TA adjustment value, where performing the second TA adjustment procedure is based on the determination that the configuration of the second TA adjustment value is received within the threshold time period.

In some examples, to support transmitting the indication of the determined TA adjustment value, the TA component 825 may be configured as or otherwise support a means for transmitting the indication of the determined TA adjustment value using UCI over an uplink shared channel, UCI over an uplink control channel, a MAC-CE, or any combination thereof.

In some examples, the feedback component 845 may be configured as or otherwise support a means for monitoring, for a duration after transmitting the indication of the determined TA adjustment value, for a feedback message from the base station. In some examples, the feedback component 845 may be configured as or otherwise support a means for receiving, from the base station and during the duration, the feedback message including feedback information, where the TA adjustment procedure is performed based on receiving the feedback message.

In some examples, the feedback message indicates a second TA adjustment value, and the TA component 825 may be configured as or otherwise support a means for performing a second TA adjustment procedure using the second TA adjustment value.

In some examples, the feedback component 845 may be configured as or otherwise support a means for monitoring, for a duration after transmitting the indication of the determined TA adjustment value, for a feedback message from the base station. In some examples, the feedback component 845 may be configured as or otherwise support a means for transmitting, to the base station, an additional indication of the determined TA adjustment value based on failing to receive the feedback message during the duration.

In some examples, the determined TA adjustment value is indicated per beam, per antenna panel, per TRP, per beam group, per TA group, or any combination thereof. In some examples, the TA adjustment scheme is configured for one or more transmit beams corresponding to the beam, the antenna panel, the TRP, the beam group, the TA group, or any combination thereof.

In some examples, to support determining the TA adjustment value, the TA component 825 may be configured as or otherwise support a means for measuring one or more parameters associated with a set of multiple SSBs, where the one or more parameters include a RSRP, a location of the UE, or both. In some examples, to support determining the TA adjustment value, the TA component 825 may be configured as or otherwise support a means for calculating the TA adjustment value based on the one or more parameters.

In some examples, the time period component 840 may be configured as or otherwise support a means for receiving, from a base station, a downlink control channel order for performing a random access procedure. In some examples, the time period component 840 may be configured as or otherwise support a means for refraining from performing the TA adjustment procedure using the determined TA adjustment value based on the downlink control channel order being received within a threshold time period of determining the TA adjustment value.

In some examples, to support TA adjustment scheme, the TA component 825 may be configured as or otherwise support a means for receiving, from a base station, an indication of the TA adjustment value for the TA adjustment procedure based on the information associated with the TA adjustment procedure. In some examples, to support TA adjustment scheme, the TA component 825 may be configured as or otherwise support a means for performing the TA adjustment procedure using the indicated TA adjustment value.

In some examples, the first message includes a capability for the UE to support one or more TA adjustment schemes of the set of multiple TA adjustment schemes, one or more environmental conditions associated with the UE, or both.

Figure 9:
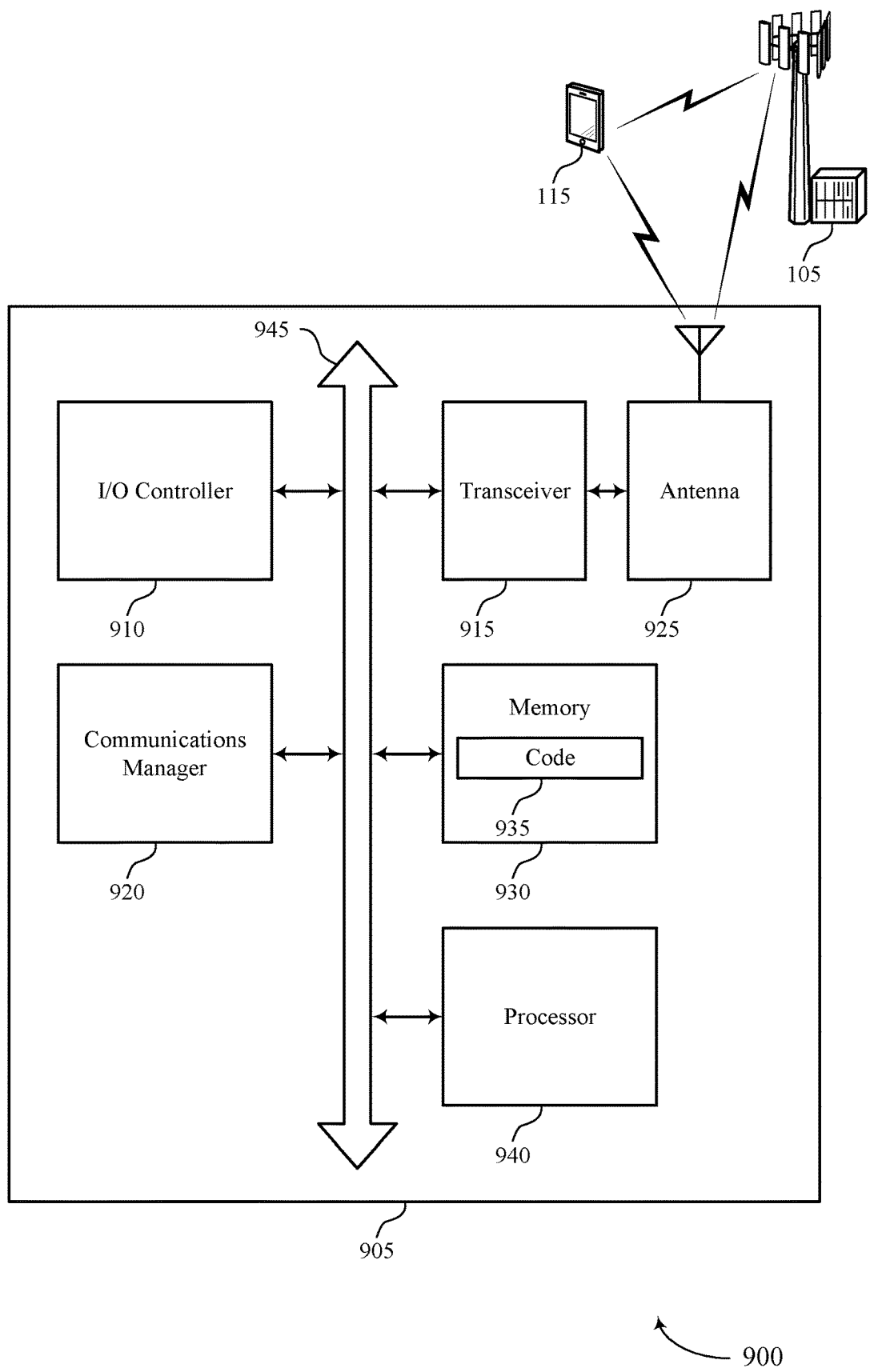
FIG. 9 shows a diagram of a system including a device that supports dynamic TA adjustment schemes in accordance with aspects of the present disclosure.

FIG. 9 shows a diagram of a system 900 including a device 905 that supports dynamic TA adjustment schemes in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting dynamic TA adjustment schemes). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for transmitting a first message including information associated with a TA adjustment procedure at the UE, where the information includes at least one of a UE capability or mobility mode of the UE. The communications manager 920 may be configured as or otherwise support a means for receiving a second message configuring the UE with a TA adjustment scheme that is from a set of multiple TA adjustment schemes, the TA adjustment scheme being based on the first message. The communications manager 920 may be configured as or otherwise support a means for transmitting an uplink message based on performing the TA adjustment procedure, where the TA adjustment procedure includes applying a TA adjustment value to the uplink message in accordance with the TA adjustment scheme.

By including or configuring the communications manager 920 in accordance with examples as described herein, the device 905 may support techniques for improved user experience related to reduced processing, reduced power consumption, more efficient utilization of communication resources, improved coordination between devices, longer battery life, improved utilization of processing capability based on the base station 105 selecting a TA adjustment scheme for adjusting a TA value at the UE 115.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of dynamic TA adjustment schemes as described herein, or the processor 940 and the memory 930 may be otherwise configured to perform or support such operations.

Figure 10:
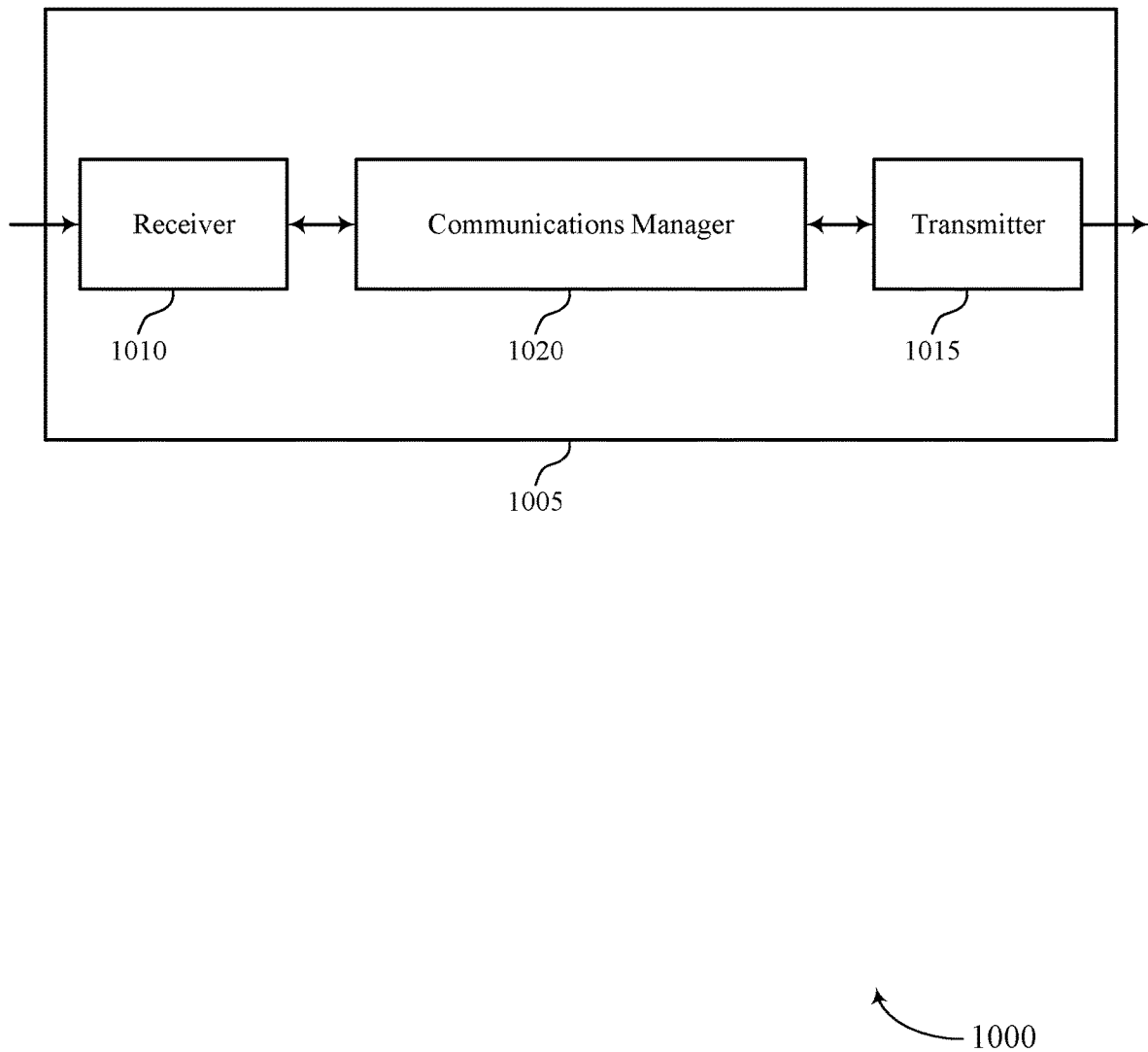
FIGS. 10 and 11 show block diagrams of devices that support dynamic TA adjustment schemes in accordance with aspects of the present disclosure.

FIG. 10 shows a block diagram 1000 of a device 1005 that supports dynamic TA adjustment schemes in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic TA adjustment schemes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to dynamic TA adjustment schemes). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of dynamic TA adjustment schemes as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for receiving, from a UE, a first message including information associated with a TA adjustment procedure at the UE, where the information includes at least one of a UE capability or mobility mode of the UE. The communications manager 1020 may be configured as or otherwise support a means for selecting a TA adjustment scheme from a set of multiple TA adjustment schemes, where the TA adjustment scheme is selected based on the first message. The communications manager 1020 may be configured as or otherwise support a means for transmitting a second message configuring the UE with the selected TA adjustment scheme. The communications manager 1020 may be configured as or otherwise support a means for receiving an uplink message from the UE in accordance with the selected TA adjustment scheme.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, more efficient utilization of communication resources based on the base station 105 selecting a TA adjustment scheme for adjusting a TA value at the UE 115.

Figure 11:
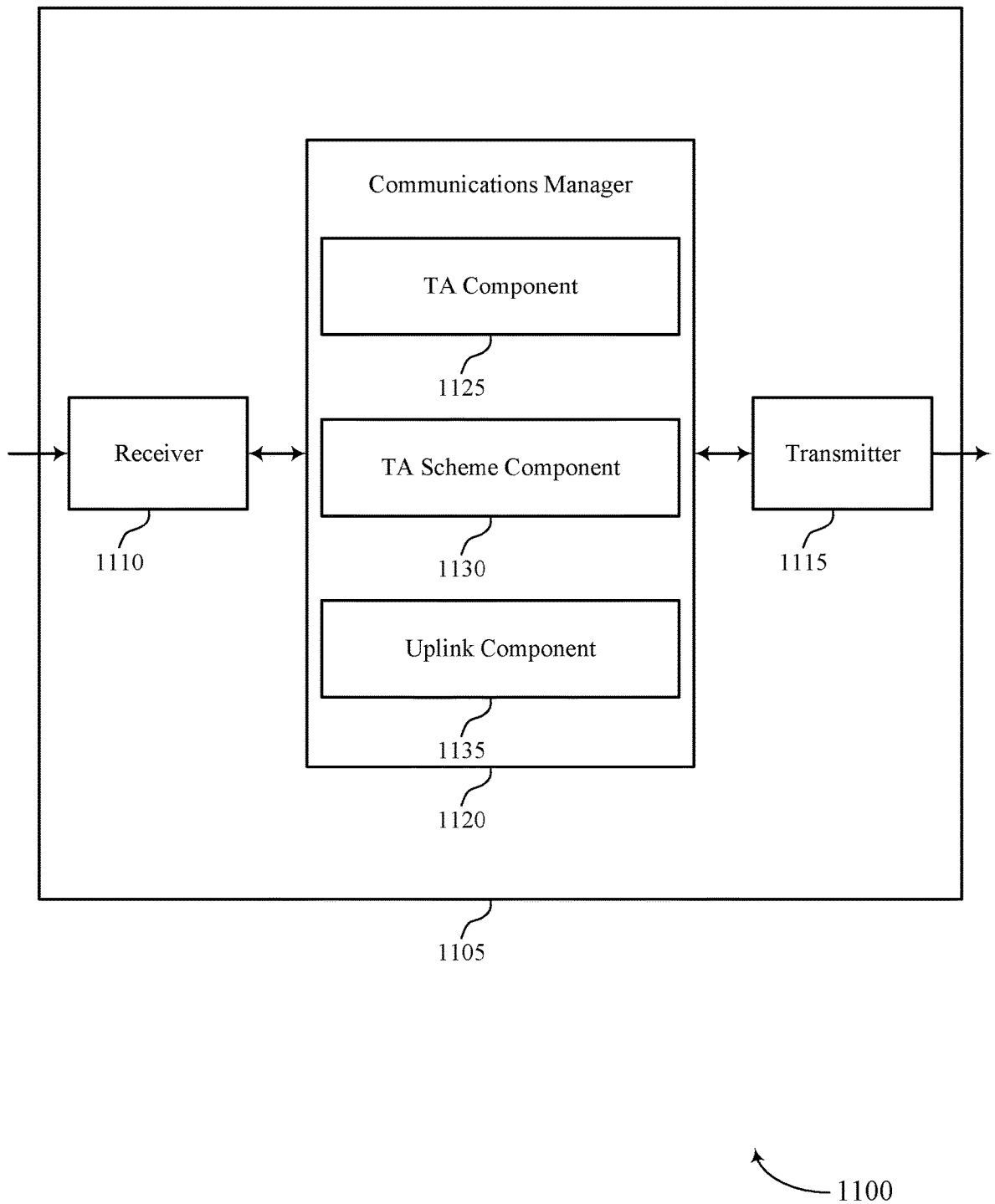

FIG. 11 shows a block diagram 1100 of a device 1105 that supports dynamic TA adjustment schemes in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to dynamic TA adjustment schemes). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to dynamic TA adjustment schemes). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of dynamic TA adjustment schemes as described herein. For example, the communications manager 1120 may include a TA component 1125, a TA scheme component 1130, an uplink component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The TA component 1125 may be configured as or otherwise support a means for receiving, from a UE, a first message including information associated with a TA adjustment procedure at the UE, where the information includes at least one of a UE capability or mobility mode of the UE. The TA scheme component 1130 may be configured as or otherwise support a means for selecting a TA adjustment scheme from a set of multiple TA adjustment schemes, where the TA adjustment scheme is selected based on the first message. The TA scheme component 1130 may be configured as or otherwise support a means for transmitting a second message configuring the UE with the selected TA adjustment scheme. The uplink component 1135 may be configured as or otherwise support a means for receiving an uplink message from the UE in accordance with the selected TA adjustment scheme.

Figure 12:
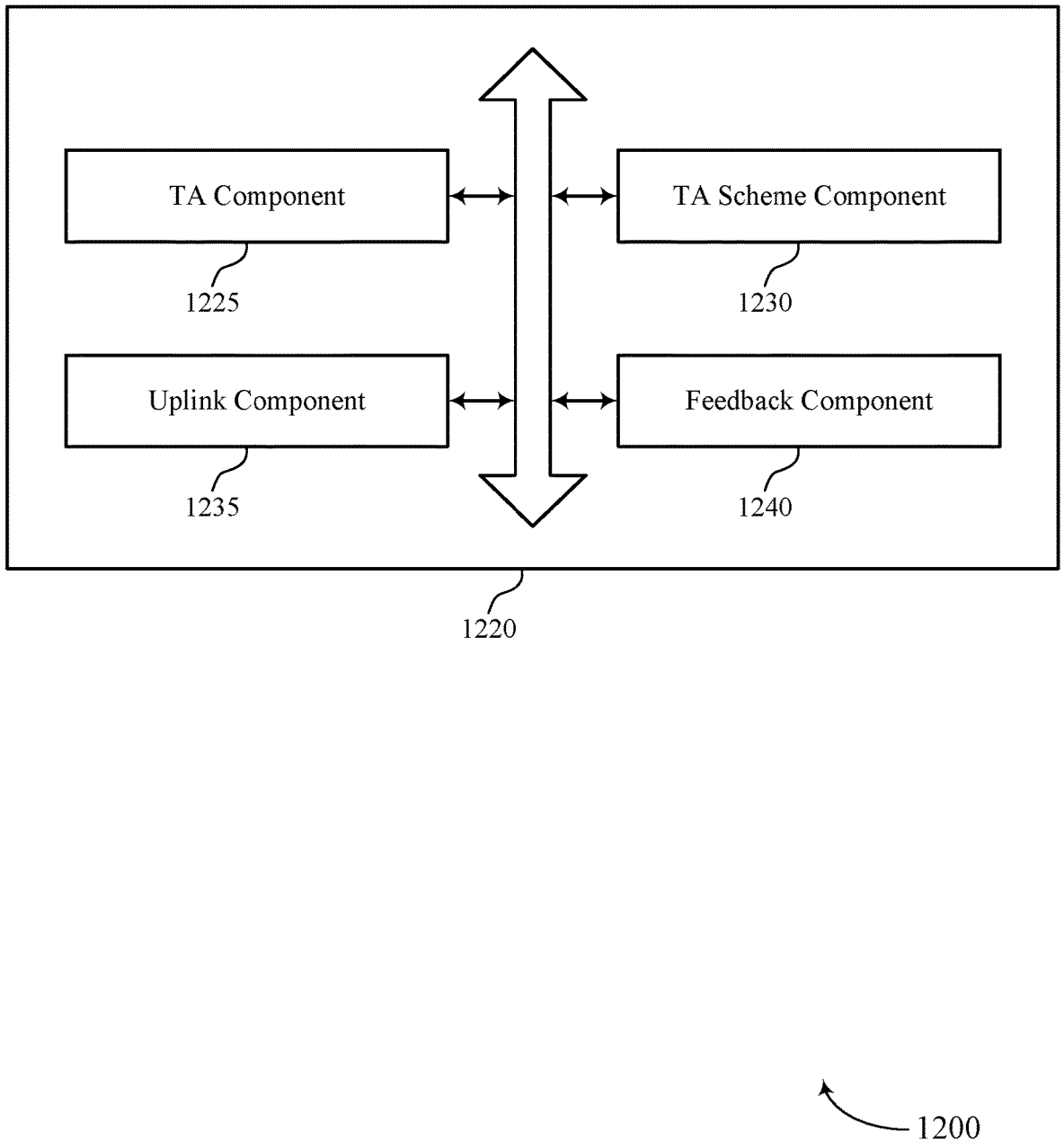
FIG. 12 shows a block diagram of a communications manager that supports dynamic TA adjustment schemes in accordance with aspects of the present disclosure.

FIG. 12 shows a block diagram 1200 of a communications manager 1220 that supports dynamic TA adjustment schemes in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of dynamic TA adjustment schemes as described herein. For example, the communications manager 1220 may include a TA component 1225, a TA scheme component 1230, an uplink component 1235, a feedback component 1240, or any combination thereof. Each of these components may communicate, directly or indirectly, with one another (e.g., via one or more buses).

The communications manager 1220 may support wireless communications at a base station in accordance with examples as disclosed herein. The TA component 1225 may be configured as or otherwise support a means for receiving, from a UE, a first message including information associated with a TA adjustment procedure at the UE, where the information includes at least one of a UE capability or mobility mode of the UE. The TA scheme component 1230 may be configured as or otherwise support a means for selecting a TA adjustment scheme from a set of multiple TA adjustment schemes, where the TA adjustment scheme is selected based on the first message. In some examples, the TA scheme component 1230 may be configured as or otherwise support a means for transmitting a second message configuring the UE with the selected TA adjustment scheme. The uplink component 1235 may be configured as or otherwise support a means for receiving an uplink message from the UE in accordance with the selected TA adjustment scheme.

In some examples, to support TA adjustment scheme, the TA component 1225 may be configured as or otherwise support a means for receiving, from the UE, an indication of a TA adjustment value determined at the UE. In some examples, the indication is received based on the UE performing the TA adjustment procedure.

In some examples, the TA component 1225 may be configured as or otherwise support a means for transmitting, to the UE, a third message configuring the indicated TA adjustment value. In some examples, the TA component 1225 may be configured as or otherwise support a means for transmitting, to the UE, a configuration of a second TA adjustment value, where the indication of the second TA adjustment value is transmitted before receiving the indication of the TA adjustment value.

In some examples, the feedback component 1240 may be configured as or otherwise support a means for transmitting, to the UE and during a duration after receiving the indication of the determined TA adjustment value, a feedback message including feedback information. In some examples, the feedback message indicates a second TA adjustment value.

In some examples, the TA component 1225 may be configured as or otherwise support a means for receiving, from the UE, an additional indication of the determined TA adjustment value.

In some examples, the determined TA adjustment value is indicated per beam, per antenna panel, per TRP, per beam group, per TA group, or any combination thereof. In some examples, the TA adjustment scheme is configured for one or more transmit beams corresponding to the beam, the antenna panel, the TRP, the beam group, the TA group, or any combination thereof.

In some examples, the TA component 1225 may be configured as or otherwise support a means for transmitting, to the UE, a downlink control channel order for performing a random access procedure. In some examples, to support TA adjustment scheme, the TA component 1225 may be configured as or otherwise support a means for transmitting, to the UE, an indication of a TA adjustment value for the TA adjustment procedure based on the information associated with the TA adjustment procedure.

Figure 13:
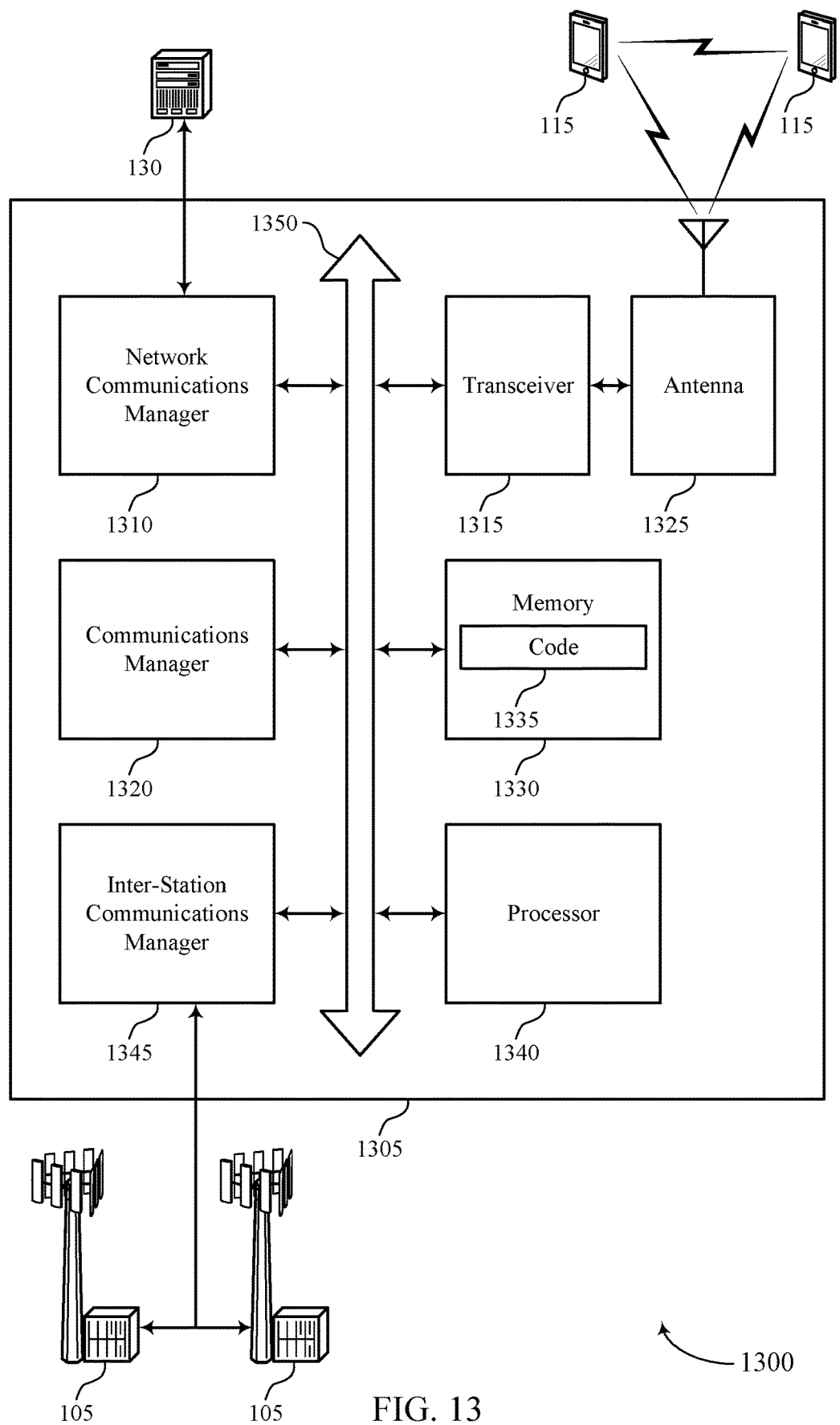
FIG. 13 shows a diagram of a system including a device that supports dynamic TA adjustment schemes in accordance with aspects of the present disclosure.

FIG. 13 shows a diagram of a system 1300 including a device 1305 that supports dynamic TA adjustment schemes in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting dynamic TA adjustment schemes). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for receiving, from a UE, a first message including information associated with a TA adjustment procedure at the UE, where the information includes at least one of a UE capability or mobility mode of the UE. The communications manager 1320 may be configured as or otherwise support a means for selecting a TA adjustment scheme from a set of multiple TA adjustment schemes, where the TA adjustment scheme is selected based on the first message. The communications manager 1320 may be configured as or otherwise support a means for transmitting a second message configuring the UE with the selected TA adjustment scheme. The communications manager 1320 may be configured as or otherwise support a means for receiving an uplink message from the UE in accordance with the selected TA adjustment scheme.

By including or configuring the communications manager 1320 in accordance with examples as described herein, the device 1305 may support techniques for improved user experience related to reduced processing, reduced power consumption, more efficient utilization of communication resources, improved coordination between devices, longer battery life, improved utilization of processing capability based on the base station 105 selecting a TA adjustment scheme for adjusting a TA value at the UE 115.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of dynamic TA adjustment schemes as described herein, or the processor 1340 and the memory 1330 may be otherwise configured to perform or support such operations.

Figure 14:
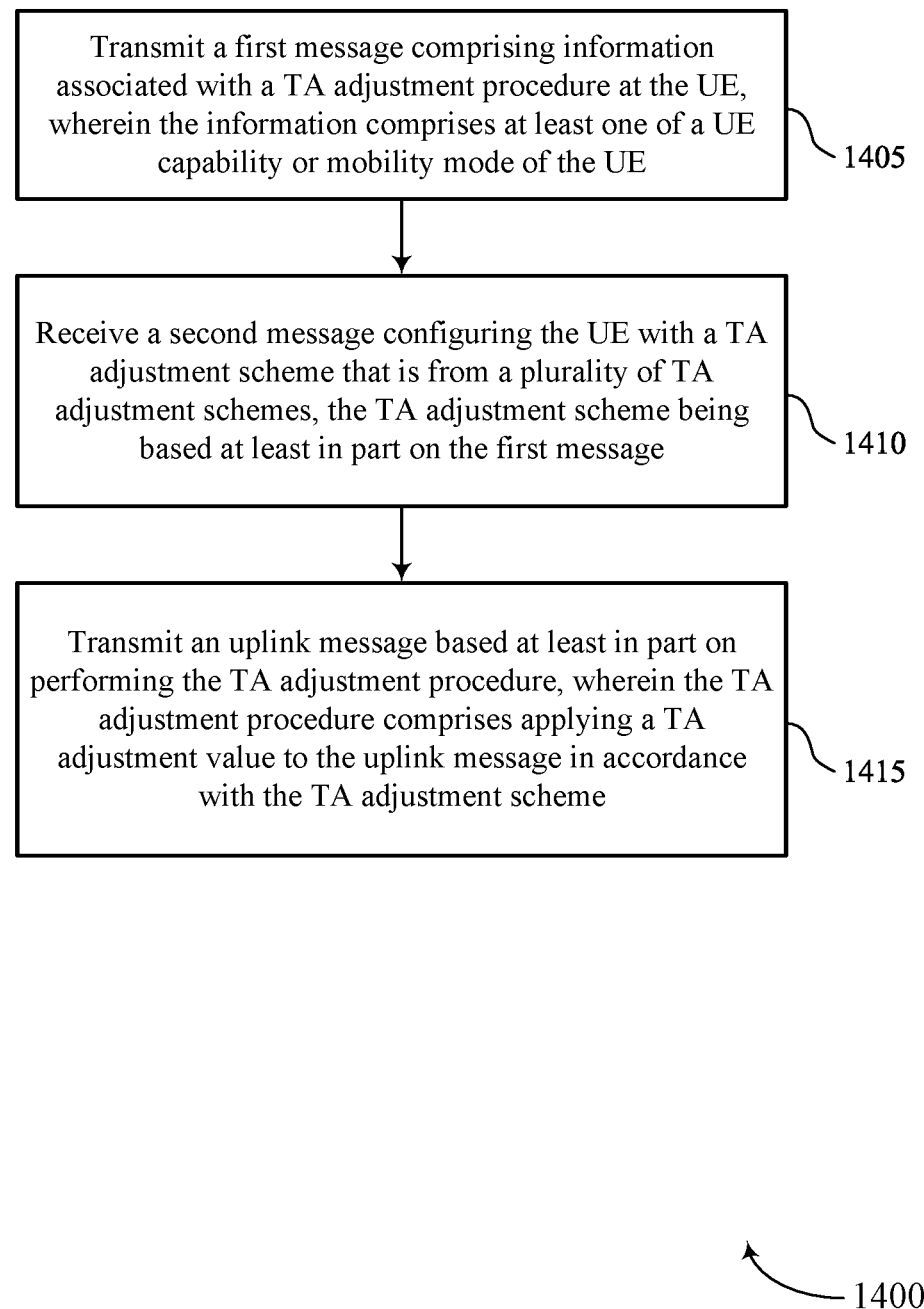
FIGS. 14 through 17 show flowcharts illustrating methods that support dynamic TA adjustment schemes in accordance with aspects of the present disclosure.

FIG. 14 shows a flowchart illustrating a method 1400 that supports dynamic TA adjustment schemes in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting a first message including information associated with a TA adjustment procedure at the UE, where the information includes at least one of a UE capability or mobility mode of the UE. The operations of 1405 may be performed in accordance with examples as disclosed herein. In some examples, aspects of the operations of 1405 may be performed by a TA component 825 as described with reference to FIG. 8.

At 1410, the method may include receiving a second message configuring the UE with a TA adjustment scheme that is from a set of multiple TA adjustment schemes, the TA adjustment scheme being based on the first message. The operations of 1410 may be performed in accordance with examples as disclosed herein. In some examples, aspects of the operations of 1410 may be performed by a TA scheme component 830 as described with reference to FIG. 8.

At 1415, the method may include transmitting an uplink message based on performing the TA adjustment procedure, where the TA adjustment procedure includes applying a TA adjustment value to the uplink message in accordance with the TA adjustment scheme. The operations of 1415 may be performed in accordance with examples as disclosed herein. In some examples, aspects of the operations of 1415 may be performed by an uplink component 835 as described with reference to FIG. 8.

Figure 15:
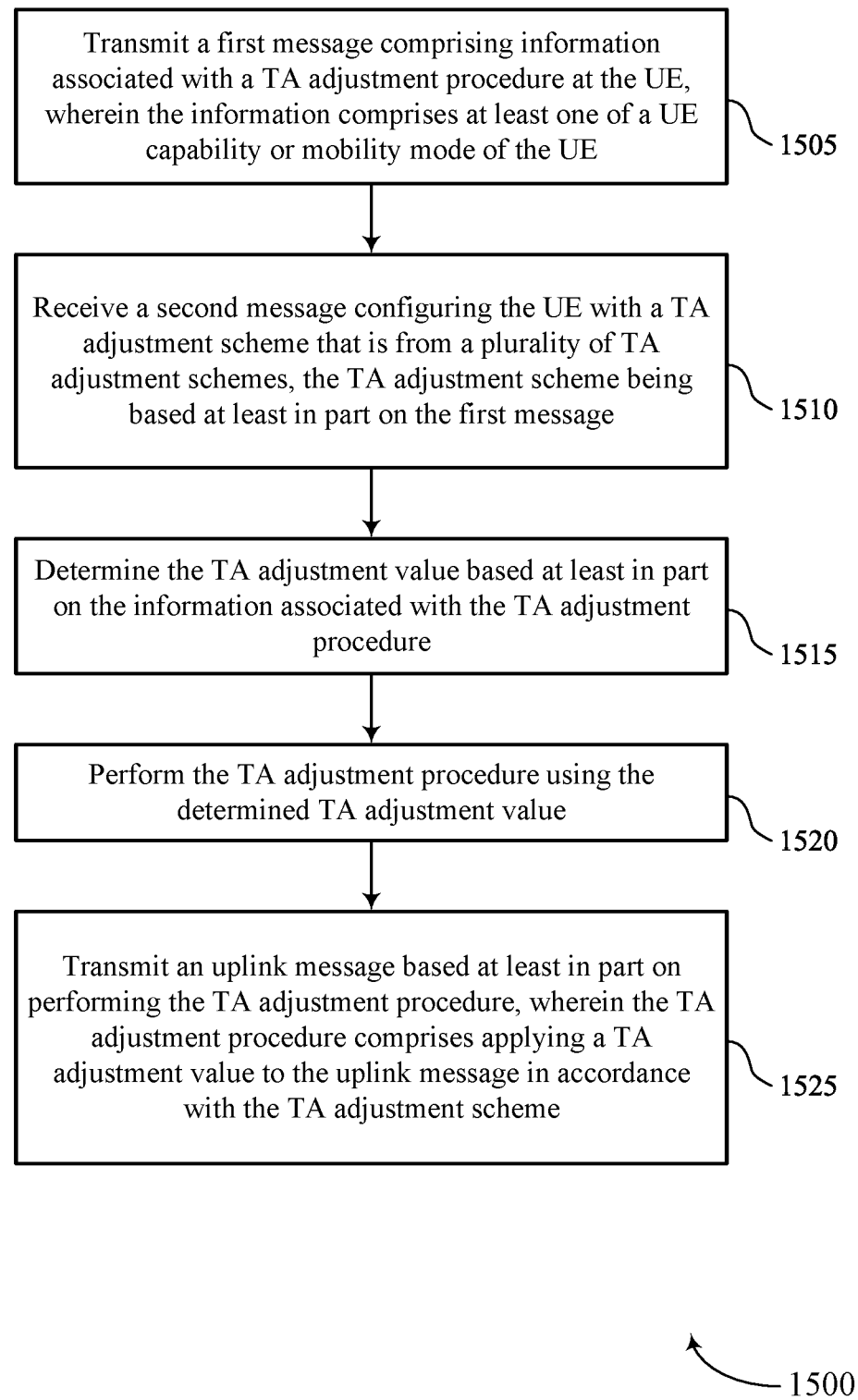

FIG. 15 shows a flowchart illustrating a method 1500 that supports dynamic TA adjustment schemes in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include transmitting a first message including information associated with a TA adjustment procedure at the UE, where the information includes at least one of a UE capability or mobility mode of the UE. The operations of 1505 may be performed in accordance with examples as disclosed herein. In some examples, aspects of the operations of 1505 may be performed by a TA component 825 as described with reference to FIG. 8.

At 1510, the method may include receiving a second message configuring the UE with a TA adjustment scheme that is from a set of multiple TA adjustment schemes, the TA adjustment scheme being based on the first message. The operations of 1510 may be performed in accordance with examples as disclosed herein. In some examples, aspects of the operations of 1510 may be performed by a TA scheme component 830 as described with reference to FIG. 8.

At 1515, the method may include determining the TA adjustment value based on the information associated with the TA adjustment procedure. The operations of 1515 may be performed in accordance with examples as disclosed herein. In some examples, aspects of the operations of 1515 may be performed by a TA component 825 as described with reference to FIG. 8.

At 1520, the method may include performing the TA adjustment procedure using the determined TA adjustment value. The operations of 1520 may be performed in accordance with examples as disclosed herein. In some examples, aspects of the operations of 1520 may be performed by a TA component 825 as described with reference to FIG. 8.

At 1525, the method may include transmitting an uplink message based on performing the TA adjustment procedure, where the TA adjustment procedure includes applying a TA adjustment value to the uplink message in accordance with the TA adjustment scheme. The operations of 1525 may be performed in accordance with examples as disclosed herein. In some examples, aspects of the operations of 1525 may be performed by an uplink component 835 as described with reference to FIG. 8.

Figure 16:
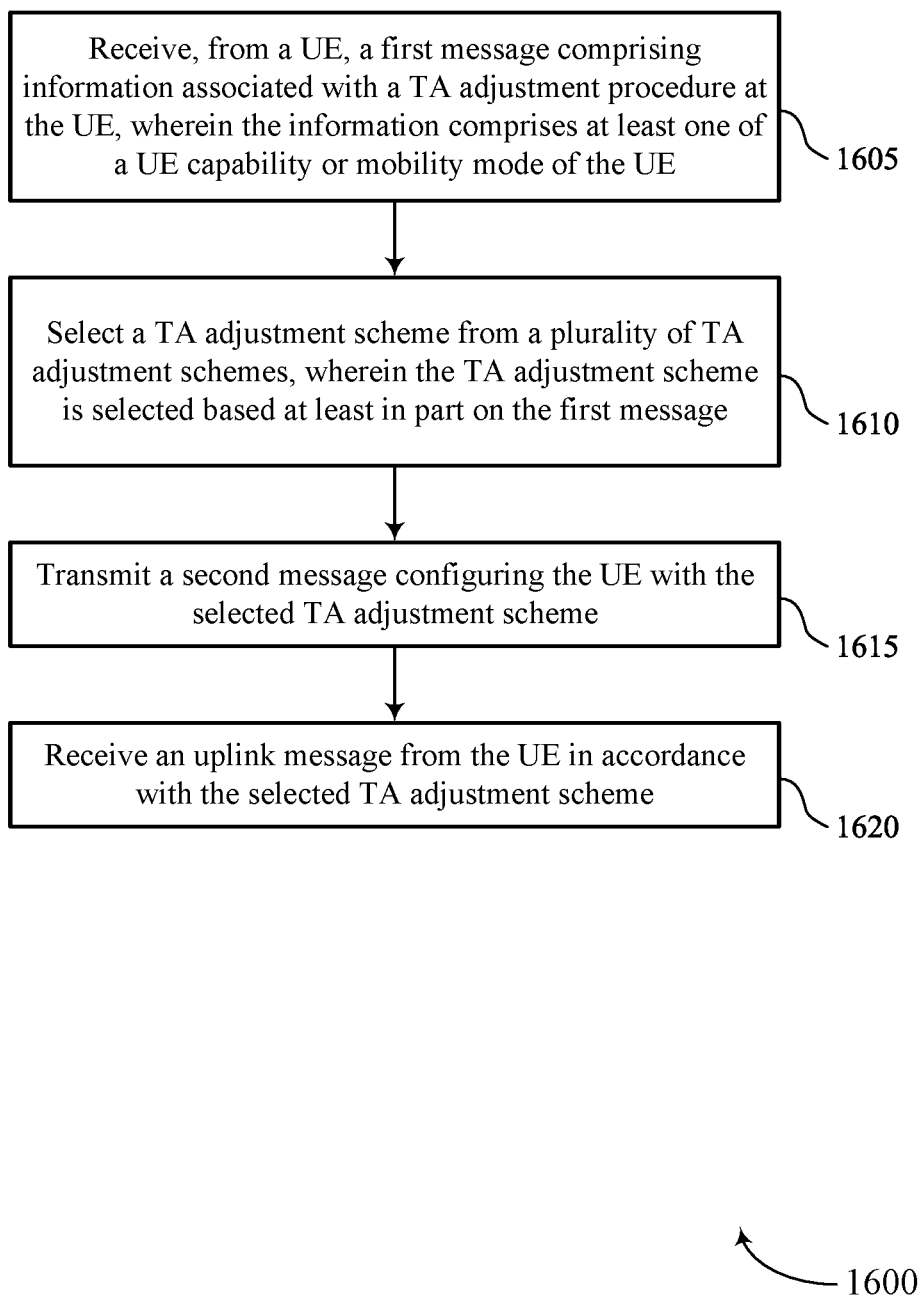

FIG. 16 shows a flowchart illustrating a method 1600 that supports dynamic TA adjustment schemes in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, a first message including information associated with a TA adjustment procedure at the UE, where the information includes at least one of a UE capability or mobility mode of the UE. The operations of 1605 may be performed in accordance with examples as disclosed herein. In some examples, aspects of the operations of 1605 may be performed by a TA component 1225 as described with reference to FIG. 12.

At 1610, the method may include selecting a TA adjustment scheme from a set of multiple TA adjustment schemes, where the TA adjustment scheme is selected based on the first message. The operations of 1610 may be performed in accordance with examples as disclosed herein. In some examples, aspects of the operations of 1610 may be performed by a TA scheme component 1230 as described with reference to FIG. 12.

At 1615, the method may include transmitting a second message configuring the UE with the selected TA adjustment scheme. The operations of 1615 may be performed in accordance with examples as disclosed herein. In some examples, aspects of the operations of 1615 may be performed by a TA scheme component 1230 as described with reference to FIG. 12.

At 1620, the method may include receiving an uplink message from the UE in accordance with the selected TA adjustment scheme. The operations of 1620 may be performed in accordance with examples as disclosed herein. In some examples, aspects of the operations of 1620 may be performed by an uplink component 1235 as described with reference to FIG. 12.

Figure 17:
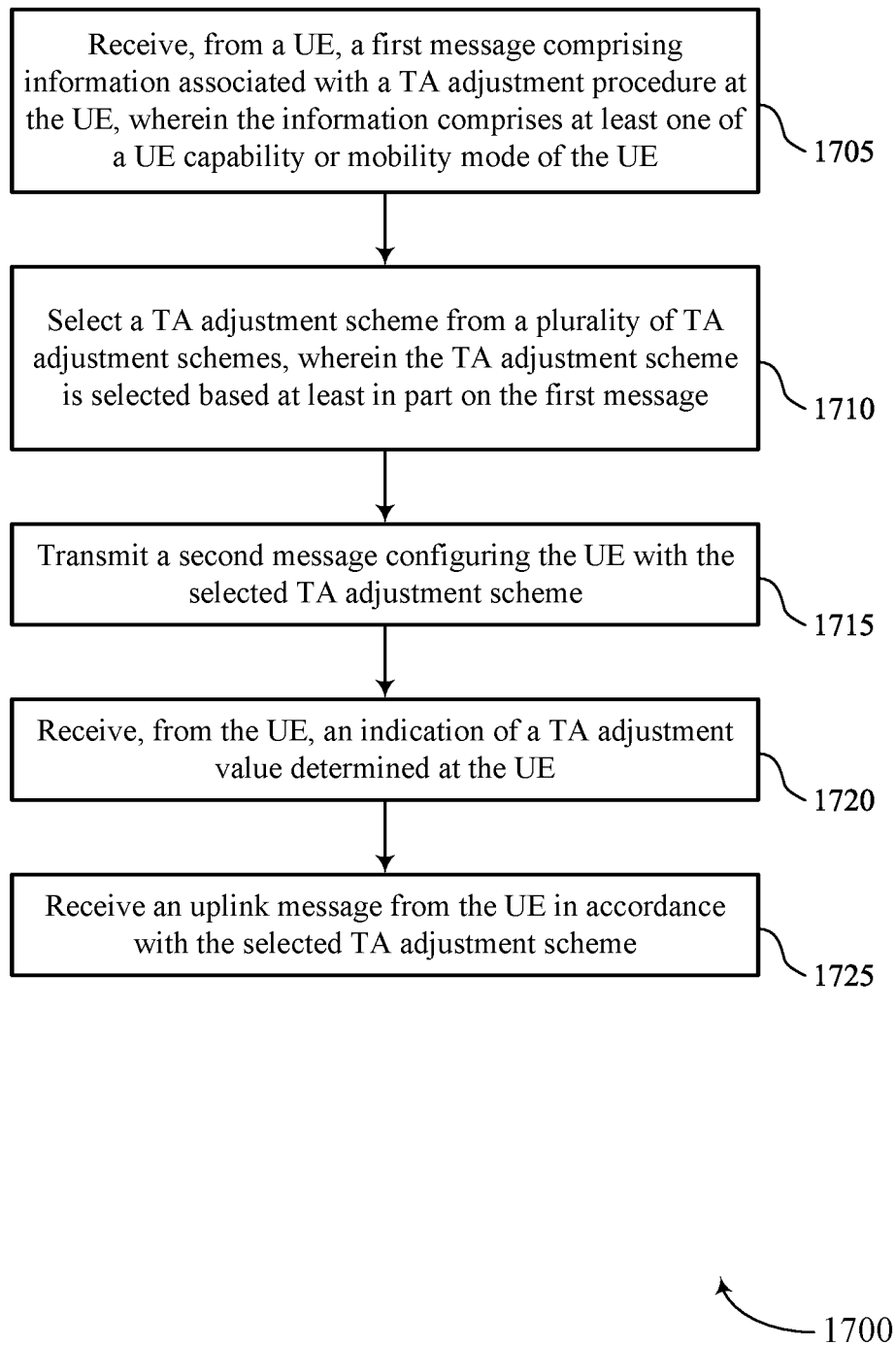

FIG. 17 shows a flowchart illustrating a method 1700 that supports dynamic TA adjustment schemes in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a first message including information associated with a TA adjustment procedure at the UE, where the information includes at least one of a UE capability or mobility mode of the UE. The operations of 1705 may be performed in accordance with examples as disclosed herein. In some examples, aspects of the operations of 1705 may be performed by a TA component 1225 as described with reference to FIG. 12.

At 1710, the method may include selecting a TA adjustment scheme from a set of multiple TA adjustment schemes, where the TA adjustment scheme is selected based on the first message. The operations of 1710 may be performed in accordance with examples as disclosed herein. In some examples, aspects of the operations of 1710 may be performed by a TA scheme component 1230 as described with reference to FIG. 12.

At 1715, the method may include transmitting a second message configuring the UE with the selected TA adjustment scheme. The operations of 1715 may be performed in accordance with examples as disclosed herein. In some examples, aspects of the operations of 1715 may be performed by a TA scheme component 1230 as described with reference to FIG. 12.

At 1720, the method may include receiving, from the UE, an indication of a TA adjustment value determined at the UE. The operations of 1720 may be performed in accordance with examples as disclosed herein. In some examples, aspects of the operations of 1720 may be performed by a TA component 1225 as described with reference to FIG. 12.

At 1725, the method may include receiving an uplink message from the UE in accordance with the selected TA adjustment scheme. The operations of 1725 may be performed in accordance with examples as disclosed herein. In some examples, aspects of the operations of 1725 may be performed by an uplink component 1235 as described with reference to FIG. 12.

The following provides an overview of aspects of the present disclosure:

Aspect 1: A method for wireless communications at a UE, comprising: transmitting a first message comprising information associated with a timing advance adjustment procedure at the UE, wherein the information comprises at least one of a UE capability or mobility mode of the UE; receiving a second message configuring the UE with a timing advance adjustment scheme that is from a plurality of timing advance adjustment schemes, the timing advance adjustment scheme being based at least in part on the first message; and transmitting an uplink message based at least in part on performing the timing advance adjustment procedure, wherein the timing advance adjustment procedure comprises applying a timing advance adjustment value to the uplink message in accordance with the timing advance adjustment scheme.

Aspect 2: The method of aspect 1, wherein the timing advance adjustment scheme comprises: determining the timing advance adjustment value based at least in part on the information associated with the timing advance adjustment procedure; and performing the timing advance adjustment procedure using the determined timing advance adjustment value.

Aspect 3: The method of aspect 2, wherein the timing advance adjustment scheme further comprises: transmitting, to a base station, an indication of the determined timing advance adjustment value.

Aspect 4: The method of aspect 3, wherein the indication is transmitted based at least in part on performing the timing advance adjustment procedure.

Aspect 5: The method of any of aspects 3 through 4, further comprising: receiving, from the base station, a third message configuring the indicated timing advance adjustment value, wherein the timing advance adjustment procedure is performed based at least in part on receiving the third message configuring the indicated timing advance adjustment value.

Aspect 6: The method of aspect 5, further comprising: determining a second timing advance adjustment value based at least in part on the information associated with the timing advance adjustment procedure; and refraining from applying the second timing advance adjustment value or transmitting an indication of the second timing advance adjustment value for a duration based at least in part on receiving the third message configuring the indicated timing advance adjustment value.

Aspect 7: The method of any of aspects 3 through 6, further comprising: receiving, from the base station, a configuration of a second timing advance adjustment value, wherein the indication of the second timing advance adjustment value is received after transmitting the indication of the timing advance adjustment value; and performing a second timing advance adjustment procedure using the second timing advance adjustment value based at least in part on the configuration of the second timing advance adjustment value.

Aspect 8: The method of aspect 7, further comprising: determining that the configuration of the second timing advance adjustment value is received within a threshold time period after transmitting the indication of the timing advance adjustment value, wherein performing the second timing advance adjustment procedure is based at least in part on the determination that the configuration of the second timing advance adjustment value is received within the threshold time period.

Aspect 9: The method of any of aspects 3 through 8, wherein transmitting the indication of the determined timing advance adjustment value comprises: transmitting the indication of the determined timing advance adjustment value using uplink control information over an uplink shared channel, uplink control information over an uplink control channel, a MAC-CE, or any combination thereof.

Aspect 10: The method of any of aspects 3 through 9, further comprising: monitoring, for a duration after transmitting the indication of the determined timing advance adjustment value, for a feedback message from the base station; receiving, from the base station and during the duration, the feedback message comprising feedback information, wherein the timing advance adjustment procedure is performed based at least in part on receiving the feedback message.

Aspect 11: The method of aspect 10, wherein the feedback message indicates a second timing advance adjustment value, the method further comprising: performing a second timing advance adjustment procedure using the second timing advance adjustment value.

Aspect 12: The method of any of aspects 3 through 11, further comprising: monitoring, for a duration after transmitting the indication of the determined timing advance adjustment value, for a feedback message from the base station; transmitting, to the base station, an additional indication of the determined timing advance adjustment value based at least in part on failing to receive the feedback message during the duration.

Aspect 13: The method of any of aspects 3 through 12, wherein the determined timing advance adjustment value is indicated per beam, per antenna panel, per transmission reception point, per beam group, per timing advance group, or any combination thereof and the timing advance adjustment scheme is configured for one or more transmit beams corresponding to the beam, the antenna panel, the transmission reception point, the beam group, the timing advance group, or any combination thereof.

Aspect 14: The method of any of aspects 2 through 13, wherein determining the timing advance adjustment value comprises: measuring one or more parameters associated with a plurality of synchronization signal blocks, wherein the one or more parameters comprise a reference signal receive power, a location of the UE, or both; and calculating the timing advance adjustment value based at least in part on the one or more parameters.

Aspect 15: The method of any of aspects 2 through 14, further comprising: receiving, from a base station, a downlink control channel order for performing a random access procedure; and refraining from performing the timing advance adjustment procedure using the determined timing advance adjustment value based at least in part on the downlink control channel order being received within a threshold time period of determining the timing advance adjustment value.

Aspect 16: The method of any of aspects 1 through 15, wherein the timing advance adjustment scheme comprises: receiving, from a base station, an indication of the timing advance adjustment value for the timing advance adjustment procedure based at least in part on the information associated with the timing advance adjustment procedure; and performing the timing advance adjustment procedure using the indicated timing advance adjustment value.

Aspect 17: The method of any of aspects 1 through 16, wherein the first message comprises a capability for the UE to support one or more timing advance adjustment schemes of the plurality of timing advance adjustment schemes, one or more environmental conditions associated with the UE, or both.

Aspect 18: A method for wireless communications at a base station, comprising: receiving, from a UE, a first message comprising information associated with a timing advance adjustment procedure at the UE, wherein the information comprises at least one of a UE capability or mobility mode of the UE; selecting a timing advance adjustment scheme from a plurality of timing advance adjustment schemes, wherein the timing advance adjustment scheme is selected based at least in part on the first message; transmitting a second message configuring the UE with the selected timing advance adjustment scheme; and receiving an uplink message from the UE in accordance with the selected timing advance adjustment scheme.

Aspect 19: The method of aspect 18, wherein the timing advance adjustment scheme comprises: receiving, from the UE, an indication of a timing advance adjustment value determined at the UE.

Aspect 20: The method of aspect 19, wherein the indication is received based at least in part on the UE performing the timing advance adjustment procedure.

Aspect 21: The method of any of aspects 19 through 20, further comprising: transmitting, to the UE, a third message configuring the indicated timing advance adjustment value.

Aspect 22: The method of any of aspects 19 through 21, further comprising: transmitting, to the UE, a configuration of a second timing advance adjustment value, wherein the indication of the second timing advance adjustment value is transmitted before receiving the indication of the timing advance adjustment value.

Aspect 23: The method of any of aspects 19 through 22, further comprising: transmitting, to the UE and during a duration after receiving the indication of the determined timing advance adjustment value, a feedback message comprising feedback information.

Aspect 24: The method of aspect 23, wherein the feedback message indicates a second timing advance adjustment value.

Aspect 25: The method of any of aspects 19 through 24, further comprising: receiving, from the UE, an additional indication of the determined timing advance adjustment value.

Aspect 26: The method of any of aspects 19 through 25, wherein the determined timing advance adjustment value is indicated per beam, per antenna panel, per transmission reception point, per beam group, per timing advance group, or any combination thereof and the timing advance adjustment scheme is configured for one or more transmit beams corresponding to the beam, the antenna panel, the transmission reception point, the beam group, the timing advance group, or any combination thereof.

Aspect 27: The method of any of aspects 18 through 26, further comprising: transmitting, to the UE, a downlink control channel order for performing a random access procedure.

Aspect 28: The method of any of aspects 18 through 27, wherein the timing advance adjustment scheme comprises: transmitting, to the UE, an indication of a timing advance adjustment value for the timing advance adjustment procedure based at least in part on the information associated with the timing advance adjustment procedure.

Aspect 29: An apparatus for wireless communications at a UE, comprising a processor; memory coupled with the processor; and instructions stored in the memory and executable by the processor to cause the apparatus to perform a method of any of aspects 1 through 17.

Aspect 30: An apparatus for wireless communications at a UE, comprising at least one means for performing a method of any of aspects 1 through 17.

Aspect 31: A non-transitory computer-readable medium storing code for wireless communications at a UE, the code comprising instructions executable by a processor to perform a method of any of aspects 1 through 17.

Aspect 32: An apparatus for wireless communications at a base station, comprising a processor; memory coupled with the processor; and instructions stored in the memory and executable by the processor to cause the apparatus to perform a method of any of aspects 18 through 28.

Aspect 33: An apparatus for wireless communications at a base station, comprising at least one means for performing a method of any of aspects 18 through 28.

Aspect 34: A non-transitory computer-readable medium storing code for wireless communications at a base station, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting a first message comprising information associated with a timing advance adjustment procedure at the UE, wherein the information comprises at least one of a UE capability or mobility mode of the UE;
   receiving a second message configuring the UE with a timing advance adjustment scheme that is from a plurality of timing advance adjustment schemes, the timing advance adjustment scheme being based at least in part on the first message; and
   transmitting an uplink message based at least in part on performing the timing advance adjustment procedure, wherein the timing advance adjustment procedure comprises applying a timing advance adjustment value to the uplink message in accordance with the timing advance adjustment scheme.

2. The method of claim 1, wherein the timing advance adjustment scheme comprises:
   determining the timing advance adjustment value based at least in part on the information associated with the timing advance adjustment procedure; and
   performing the timing advance adjustment procedure using the determined timing advance adjustment value.

3. The method of claim 2, wherein the timing advance adjustment scheme further comprises:
   transmitting, to a base station, an indication of the determined timing advance adjustment value.

4. The method of claim 3, wherein the indication is transmitted based at least in part on performing the timing advance adjustment procedure.

5. The method of claim 3, further comprising:
   receiving, from the base station, a third message configuring the indicated timing advance adjustment value, wherein the timing advance adjustment procedure is performed based at least in part on receiving the third message configuring the indicated timing advance adjustment value.

6. The method of claim 5, further comprising:
   determining a second timing advance adjustment value based at least in part on the information associated with the timing advance adjustment procedure; and
   refraining from applying the second timing advance adjustment value or transmitting an indication of the second timing advance adjustment value for a duration based at least in part on receiving the third message configuring the indicated timing advance adjustment value.

7. The method of claim 3, further comprising:
   receiving, from the base station, a configuration of a second timing advance adjustment value, wherein the indication of the second timing advance adjustment value is received after transmitting the indication of the timing advance adjustment value; and
   performing a second timing advance adjustment procedure using the second timing advance adjustment value based at least in part on the configuration of the second timing advance adjustment value.

8. The method of claim 7, further comprising:
   determining that the configuration of the second timing advance adjustment value is received within a threshold time period after transmitting the indication of the timing advance adjustment value, wherein performing the second timing advance adjustment procedure is based at least in part on the determination that the configuration of the second timing advance adjustment value is received within the threshold time period.

9. The method of claim 3, wherein transmitting the indication of the determined timing advance adjustment value comprises:
   transmitting the indication of the determined timing advance adjustment value using uplink control information over an uplink shared channel, uplink control information over an uplink control channel, a medium access control (MAC) control element, or any combination thereof.

10. The method of claim 3, further comprising:
    monitoring, for a duration after transmitting the indication of the determined timing advance adjustment value, for a feedback message from the base station;
    receiving, from the base station and during the duration, the feedback message comprising feedback information, wherein the timing advance adjustment procedure is performed based at least in part on receiving the feedback message.

11. The method of claim 10, wherein the feedback message indicates a second timing advance adjustment value, the method further comprising:
    performing a second timing advance adjustment procedure using the second timing advance adjustment value.

12. The method of claim 3, further comprising:
    monitoring, for a duration after transmitting the indication of the determined timing advance adjustment value, for a feedback message from the base station;
    transmitting, to the base station, an additional indication of the determined timing advance adjustment value based at least in part on failing to receive the feedback message during the duration.

13. The method of claim 3, wherein:
    the determined timing advance adjustment value is indicated per beam, per antenna panel, per transmission reception point, per beam group, per timing advance group, or any combination thereof; and
    the timing advance adjustment scheme is configured for one or more transmit beams corresponding to the beam, the antenna panel, the transmission reception point, the beam group, the timing advance group, or any combination thereof.

14. The method of claim 2, wherein determining the timing advance adjustment value comprises:
    measuring one or more parameters associated with a plurality of synchronization signal blocks, wherein the one or more parameters comprise a reference signal received power, a location of the UE, or both; and
    calculating the timing advance adjustment value based at least in part on the one or more parameters.

15. The method of claim 2, further comprising:
    receiving, from a base station, a downlink control channel order for performing a random access procedure; and
    refraining from performing the timing advance adjustment procedure using the determined timing advance adjustment value based at least in part on the downlink control channel order being received within a threshold time period of determining the timing advance adjustment value.

16. The method of claim 1, wherein the timing advance adjustment scheme comprises:
    receiving, from a base station, an indication of the timing advance adjustment value for the timing advance adjustment procedure based at least in part on the information associated with the timing advance adjustment procedure; and performing the timing advance adjustment procedure using the indicated timing advance adjustment value.

17. The method of claim 1, wherein the first message comprises a capability for the UE to support one or more timing advance adjustment schemes of the plurality of timing advance adjustment schemes, one or more environmental conditions associated with the UE, or both.

18. A method for wireless communications at a base station, comprising:
receiving, from a user equipment (UE), a first message comprising information associated with a timing advance adjustment procedure at the UE, wherein the information comprises at least one of a UE capability or mobility mode of the UE;
selecting a timing advance adjustment scheme from a plurality of timing advance adjustment schemes, wherein the timing advance adjustment scheme is selected based at least in part on the first message;
transmitting a second message configuring the UE with the selected timing advance adjustment scheme; and
receiving an uplink message from the UE in accordance with the selected timing advance adjustment scheme.

19. The method of claim 18, wherein the timing advance adjustment scheme comprises:
receiving, from the UE, an indication of a timing advance adjustment value determined at the UE.

20. The method of claim 19, wherein the indication is received based at least in part on the UE performing the timing advance adjustment procedure.

21. The method of claim 19, further comprising:
transmitting, to the UE, a third message configuring the indicated timing advance adjustment value.

22. The method of claim 19, further comprising:
transmitting, to the UE, a configuration of a second timing advance adjustment value, wherein the indication of the second timing advance adjustment value is transmitted before receiving the indication of the timing advance adjustment value.

23. The method of claim 19, further comprising:
transmitting, to the UE and during a duration after receiving the indication of the determined timing advance adjustment value, a feedback message comprising feedback information.

24. The method of claim 23, wherein the feedback message indicates a second timing advance adjustment value.

25. The method of claim 19, further comprising:
receiving, from the UE, an additional indication of the determined timing advance adjustment value.

26. The method of claim 19, wherein:
the determined timing advance adjustment value is indicated per beam, per antenna panel, per transmission reception point, per beam group, per timing advance group, or any combination thereof; and
the timing advance adjustment scheme is configured for one or more transmit beams corresponding to the beam, the antenna panel, the transmission reception point, the beam group, the timing advance group, or any combination thereof.

27. The method of claim 18, further comprising:
transmitting, to the UE, a downlink control channel order for performing a random access procedure.

28. The method of claim 18, wherein the timing advance adjustment scheme comprises:
transmitting, to the UE, an indication of a timing advance adjustment value for the timing advance adjustment procedure based at least in part on the information associated with the timing advance adjustment procedure.

29. An apparatus for wireless communications at a user equipment (UE), comprising:
a processor;
memory coupled with the processor; and
instructions stored in the memory and executable by the processor to cause the apparatus to:
transmit a first message comprising information associated with a timing advance adjustment procedure at the UE, wherein the information comprises at least one of a UE capability or mobility mode of the UE;
receive a second message configuring the UE with a timing advance adjustment scheme that is from a plurality of timing advance adjustment schemes, the timing advance adjustment scheme being based at least in part on the first message; and
transmit an uplink message based at least in part on performing the timing advance adjustment procedure, wherein the timing advance adjustment procedure comprises applying a timing advance adjustment value to the uplink message in accordance with the timing advance adjustment scheme.

30. An apparatus for wireless communications at a base station, comprising:
a processor;
memory coupled with the processor; and
instructions stored in the memory and executable by the processor to cause the apparatus to:
receive, from a user equipment (UE), a first message comprising information associated with a timing advance adjustment procedure at the UE, wherein the information comprises at least one of a UE capability or mobility mode of the UE;
select a timing advance adjustment scheme from a plurality of timing advance adjustment schemes, wherein the timing advance adjustment scheme is selected based at least in part on the first message;
transmit a second message configuring the UE with the selected timing advance adjustment scheme; and
receive an uplink message from the UE in accordance with the selected timing advance adjustment scheme.

* * * * *